United States Patent
Nakao et al.

(10) Patent No.: US 11,203,699 B2
(45) Date of Patent: Dec. 21, 2021

(54) RESIN EMULSION FOR COATING MATERIALS

(71) Applicant: NIPPON SHOKUBAI CO., LTD., Osaka (JP)

(72) Inventors: Kanji Nakao, Osaka (JP); Yoshiaki Kuramochi, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 15/760,576

(22) PCT Filed: Sep. 16, 2016

(86) PCT No.: PCT/JP2016/077447
§ 371 (c)(1),
(2) Date: Mar. 15, 2018

(87) PCT Pub. No.: WO2017/047749
PCT Pub. Date: Mar. 23, 2017

(65) Prior Publication Data
US 2018/0258310 A1 Sep. 13, 2018

(30) Foreign Application Priority Data

Sep. 18, 2015 (JP) .............................. JP2015-185587

(51) Int. Cl.
| | | |
|---|---|---|
| *C09D 133/10* | (2006.01) |
| *C09D 5/02* | (2006.01) |
| *C08F 257/02* | (2006.01) |
| *C09D 7/65* | (2018.01) |
| *C08F 212/08* | (2006.01) |
| *C09D 133/08* | (2006.01) |
| *C08F 220/14* | (2006.01) |
| *C09D 143/04* | (2006.01) |
| *C09D 153/00* | (2006.01) |
| *C09D 151/00* | (2006.01) |
| *C08F 2/22* | (2006.01) |
| *C08F 220/18* | (2006.01) |
| *C09D 125/14* | (2006.01) |

(52) U.S. Cl.
CPC .............. *C09D 133/10* (2013.01); *C08F 2/22* (2013.01); *C08F 212/08* (2013.01); *C08F 220/14* (2013.01); *C08F 220/18* (2013.01); *C08F 257/02* (2013.01); *C09D 5/02* (2013.01); *C09D 7/65* (2018.01); *C09D 125/14* (2013.01); *C09D 133/08* (2013.01); *C09D 143/04* (2013.01); *C09D 151/003* (2013.01); *C09D 153/00* (2013.01); *C08F 2800/20* (2013.01)

(58) Field of Classification Search
None
See application file for complete search history.

(56) References Cited

U.S. PATENT DOCUMENTS

| | | | | |
|---|---|---|---|---|
| 4,391,928 A * | 7/1983 | Herman | ................ | C08F 291/00 523/201 |
| 4,473,679 A * | 9/1984 | Falk | ....................... | C08F 257/02 524/426 |
| 5,021,469 A * | 6/1991 | Langerbeins | ......... | C08F 285/00 523/201 |
| 5,053,441 A * | 10/1991 | Biale | ..................... | C08F 257/02 428/407 |
| 5,362,804 A | 11/1994 | Oshima et al. | | |
| 5,521,253 A * | 5/1996 | Lee | ........................ | D21H 19/42 525/301 |
| 5,534,579 A * | 7/1996 | Nikaya | ................. | C08F 220/18 524/460 |
| 7,812,090 B2 * | 10/2010 | Killilea | ................. | C08F 230/08 524/818 |
| 8,562,850 B2 * | 10/2013 | Miyawaki | ................. | C08F 2/26 252/62 |
| 8,741,985 B2 * | 6/2014 | Nakao | ....................... | C08F 2/22 523/201 |
| 2001/0036986 A1 * | 11/2001 | Matsumura | ................ | C08J 7/04 524/265 |

(Continued)

FOREIGN PATENT DOCUMENTS

| | | | |
|---|---|---|---|
| CN | 102224207 A | | 10/2011 |
| JP | 03124776 A | * | 5/1991 |

(Continued)

OTHER PUBLICATIONS

JP-03124776-A, May 1991, ENG. Ab. (Year: 1991).*

(Continued)

*Primary Examiner* — Satya B Sastri
(74) *Attorney, Agent, or Firm* — Rothwell, Figg, Ernst & Manbeck, P.C.

(57) ABSTRACT

A resin emulsion for a coating material, which contains emulsion particles each having an inner layer and an outer layer, and wherein: each emulsion particle has a resin layer containing a polymer (I) that is obtained by emulsion polymerizing a monomer component A containing 80 to 100% by mass of a styrene monomer and 0 to 20% by mass of a monomer other than the styrene monomer and a resin layer containing a polymer (II) that is obtained by emulsion polymerizing a monomer component B containing 70 to 100% by mass of a (meth)acrylic acid ester and 0 to 30% by mass of a monomer other than the (meth)acrylic acid ester; and the content of the styrene monomer in all monomer components used as starting materials for the emulsion particles is 10 to 55% by mass.

12 Claims, No Drawings

(56) References Cited

U.S. PATENT DOCUMENTS

2008/0156424 A1 7/2008 Leyrer et al.
2016/0152854 A1 6/2016 Bohling et al.

FOREIGN PATENT DOCUMENTS

| JP | 6-25365 A | 2/1994 | |
|---|---|---|---|
| JP | 7-70513 A | 3/1995 | |
| JP | 2002-138123 A | 5/2002 | |
| JP | 2004-59623 A | 2/2004 | |
| JP | 2008-540787 A | 11/2008 | |
| JP | 2010-126666 A | 6/2010 | |
| JP | 2011-111492 A | 6/2011 | |
| JP | 2012-21135 A | 2/2012 | |
| JP | 2014-31456 A | 2/2014 | |
| WO | WO-9808882 A1 * | 3/1998 | ............ C08F 291/00 |

OTHER PUBLICATIONS

International Search Report dated Nov. 15, 2016 in PCT/JP2016/077447.
Chinese Office Action issued in Application No. 201680052895.0, dated Aug. 20, 2019, 18 pages.

* cited by examiner

US 11,203,699 B2

RESIN EMULSION FOR COATING MATERIALS

CROSS REFERENCE TO RELATED APPLICATION

This application is a 35 U.S.C. 371 National Phase Entry Application from PCT/JP2016/077447, filed Sep. 16, 2016, which claims priority to Japanese Patent Application No. 2015-185587, filed Sep. 18, 2015, the disclosures of which are incorporated herein in their entirety by reference, and priority is claimed to each of the foregoing.

TECHNICAL FIELD

The present invention relates to a resin emulsion for a coating material. More particularly, the present invention relates to a resin emulsion for a coating material, which can be suitably used in coating materials such as a top coating material which is called as a top coat which is applied to the surface of an interior material and an exterior material of a building, a ceramic building material and the like, a method for producing the same, and a coating material which contains the resin emulsion for a coating material.

BACKGROUND ART

In recent years, an aqueous coating material containing a water-soluble resin or a water-dispersible resin such as a resin emulsion has been used in order to solve an environmental problem caused by release of a volatile organic compound to the atmosphere. The aqueous coating material is however generally inferior in water resistance and weather resistance to an organic coating material, because water is usually used as a solvent in the aqueous coating material.

As an aqueous coating composition which is excellent in weather resistance and water resistance, there has been proposed a resin composition for an aqueous coating material, containing a resin emulsion including polymer particles having a silicon compound and/or a partially hydrolyzed condensate thereof (see, for example, Patent Literature 1). The aqueous coating composition however has been desired to be improved in weather resistance and water resistance, and a property for preventing a coating film from flowing down even when the coating film is formed in a vertical direction (hereinafter the property is referred to as "pattern-retaining property") has been required for the aqueous coating composition.

As a resin composition for a coating material, which forms a coating film excellent in weather resistance, water resistance and pattern-retaining property, there has been proposed a resin composition for a coating material in which a resin emulsion containing emulsion particles is used, wherein the content of an acid group-containing monomer is 0.3% by mass or less in monomer components which are used as raw materials of the emulsion particles (see, for example, Patent Literature 2). The above-mentioned resin composition for a coating material can be suitably used in, for example, a top coat and the like, because the resin composition is excellent in weather resistance, water resistance and pattern-retaining property.

However, in recent years, development of a resin emulsion for a coating material, which is comprehensively excellent in weather resistance, freezing flow retention property, pattern-retaining property, film forming stability at low temperatures, deformation resistance, adhesion property and dilution stability has been desired.

PRIOR ART LITERATURES

Patent Literatures

Patent Literature 1: Japanese Patent Unexamined Publication No. 2002-138123
Patent Literature 2: Japanese Patent Unexamined Publication No. 2014-031456

SUMMARY OF THE INVENTION

Problems to be Solved by the Invention

The present invention has been made in view of the above-mentioned prior art. An object of the present invention is to provide a resin emulsion for a coating material, which is comprehensively excellent in weather resistance, freezing flow retention property, pattern-retaining property, film forming stability at low temperatures, deformation resistance, adhesion property and dilution stability; a method for producing the same; and a coating material which contains the resin emulsion for a coating material.

Means for Solving the Problems

The present invention relates to:
(1) a resin emulsion containing emulsion particles having an inner layer and an outer layer, wherein the emulsion particle has a resin layer containing a polymer (I) made of a monomer component A containing 80 to 100% by mass of a styrene-based monomer and 0 to 20% by mass of a monomer other than the styrene-based monomer by emulsion polymerization, and a resin layer containing a polymer (II) made of a monomer component B containing 70 to 100% by mass of a (meth)acrylic acid ester and 0 to 30% by mass of a monomer other than the (meth)acrylic acid ester by emulsion polymerization, and wherein the content of the styrene-based monomer is 10 to 55% by mass in the total monomer components used as raw materials of the emulsion particle,
(2) the resin emulsion for a coating material according to the above-mentioned item (1), wherein the inner layer is a resin layer containing the polymer (I), and the outer layer is a resin layer containing the polymer (II),
(3) the resin emulsion for a coating material according to the above-mentioned item (1) or (2), wherein the total monomer components used as raw materials of the emulsion particle contain an acid group-containing monomer, and the content of the acid group-containing monomer is 0.1 to 10% by mass in the total monomer components,
(4) a coating material containing the resin emulsion for a coating material according to any one of the above-mentioned items (1) to (3),
(5) the coating material according to above-mentioned item (4), wherein the coating material is a top coat,
(6) a method for producing the resin emulsion containing the emulsion particles having the inner layer and the outer layer according to the above-mentioned item (1), which includes:
forming a resin layer containing a polymer (I) made of a monomer component A containing 80 to 100% by mass of a styrene-based monomer and 0 to 20% by mass of a monomer other than the styrene-based monomer by emulsion polymerization, and a resin layer containing a polymer (II) made of a monomer component B containing 70 to 100% by mass of a (meth)acrylic acid ester and 0 to 30% by mass of a monomer other than the (meth)acrylic acid ester by emulsion polymerization, and adjusting the content of the styrene-based monomer to 10 to 55% by mass in the total monomer components used as raw materials of the emulsion particle, (7) the method for producing the resin emulsion for a coating material according to the above-mentioned item (6), wherein the inner layer is a resin layer containing the polymer (I), and the outer layer is a resin layer containing the polymer (II), (8) the method for producing the resin emulsion for a coating material according to the above-mentioned item (6) or (7), which includes:

carrying out an emulsion polymerization of the monomer component A containing 80 to 100% by mass of a styrene-based monomer and 0 to 20% by mass of a monomer other than the styrene-based monomer, to form a resin layer containing the polymer (I) as an inner layer, and carrying out an emulsion polymerization of the monomer component B containing 70 to 100% by mass of a (meth)acrylic acid ester and 0 to 30% by mass of a monomer other than the (meth)acrylic acid ester, to form a resin layer containing the polymer (II) as an outer layer, and adjusting the content of the styrene-based monomer to 10 to 55% by mass in the total monomer components used as raw materials of the emulsion particle when carrying out the emulsion polymerizations, and (9) the method for producing the resin emulsion for a coating material according to any one of the above-mentioned items (6) to (8), wherein the total monomer components used as raw materials of the emulsion particle contain an acid group-containing monomer, and the content of the acid group-containing monomer is 0.1 to 10% by mass in the total monomer components.

Effect of the Invention

According to the present invention, a resin emulsion for a coating material, which is comprehensively excellent in weather resistance, freezing flow retention property, pattern-retaining property, film forming stability at low temperatures, deformation resistance, adhesion property and dilution stability is provided. In addition, according to the present invention, a coating material containing the resin emulsion for a coating material, which is comprehensively excellent in weather resistance, freezing flow retention property, pattern-retaining property, film forming stability at low temperatures, deformation resistance, adhesion property and dilution stability is provided.

MODE FOR CARRYING OUT THE INVENTION

When a styrene-based monomer is included in a content of 50% by mass or more in monomer components which are used as raw materials of emulsion particles contained in a resin emulsion which is used in a coating material, as disclosed in, for example, Japanese Patent Unexamined Publication No. Hei. 07-70513 and the like, it has been thought that a coating film will be poor in weather resistance and film forming property, and will become hard and brittle. Accordingly, it has been conventionally generally thought that incorporation of the styrene-based monomer in a content of 50% by mass or more in the monomer components which are used as raw materials of an emulsion particle is not desired.

In contrast, according to the resin emulsion of the present invention, nevertheless a resin layer of an emulsion particle contains a polymer of which monomer components include the styrene-based monomer in a content of 80% by mass or more, which far exceeds 50% by mass, the resin emulsion is comprehensively excellent in weather resistance, freezing flow retention property, pattern-retaining property, film forming stability at low temperatures, deformation resistance, adhesion property and dilution stability. Since the present invention makes it possible to use a polymer of which monomer components include the styrene-based monomer in a content of 80% by mass or more, which far exceeds 50% by mass in a polymer layer of an emulsion particle, and the resin emulsion is comprehensively excellent in weather resistance, freezing flow retention property, pattern-retaining property, film forming stability at low temperatures, deformation resistance, adhesion property and dilution stability as mentioned above, the resin emulsion is extremely high in industrial values.

The resin emulsion for a coating material of the present invention includes an emulsion particle having an inner layer and an outer layer as described above.

The resin emulsion for a coating material of the present invention is a resin emulsion containing emulsion particles having an inner layer and an outer layer, wherein the emulsion particle has a resin layer containing a polymer (I) made of a monomer component A containing 80 to 100% by mass of a styrene-based monomer and 0 to 20% by mass of a monomer other than the styrene-based monomer by emulsion polymerization, and a resin layer containing a polymer (II) made of a monomer component B containing 70 to 100% by mass of a (meth)acrylic acid ester and 0 to 30% by mass of a monomer other than the (meth)acrylic acid ester by emulsion polymerization, and wherein the content of the styrene-based monomer is 10 to 55% by mass in the total monomer components used as raw materials of the emulsion particle.

The resin emulsion for a coating material of the present invention can be produced by, for example, forming a resin layer containing a polymer (I) made of a monomer component A containing 80 to 100% by mass of a styrene-based monomer and 0 to 20% by mass of a monomer other than the styrene-based monomer by emulsion polymerization, and a resin layer containing a polymer (II) made of a monomer component B containing 70 to 100% by mass of a (meth) acrylic acid ester and 0 to 30% by mass of a monomer other than the (meth)acrylic acid ester by emulsion polymerization, and adjusting the content of the styrene-based monomer to 10 to 55% by mass in the total monomer components used as raw materials of the emulsion particle.

In the resin emulsion for a coating material of the present invention, the inner layer can be composed of a resin layer containing the polymer (I), and the outer layer can be composed of a resin layer containing the polymer (II). Alternatively, the inner layer can be composed of a resin layer containing the polymer (II), and the outer layer can be composed of a resin layer containing the polymer (I). Among them, it is preferred that the inner layer is composed of the resin layer containing the polymer (I), and the outer layer is composed of the resin layer containing the polymer (II), from the viewpoint of comprehensive improvement in weather resistance, freezing flow retention property, pattern-retaining property, film forming stability at low temperatures, deformation resistance, adhesion property and dilution stability.

Accordingly, it is preferred that the resin emulsion for a coating material of the present invention is a resin emulsion containing emulsion particles having an inner layer and an outer layer, wherein the inner layer is a resin layer containing the polymer (I) made of the monomer component A containing 80 to 100% by mass of a styrene-based monomer and 0 to 20% by mass of a monomer other than the styrene-based monomer by emulsion polymerization, and the outer layer is a resin layer containing the polymer (II) made of the monomer component B containing 70 to 100% by mass of a (meth)acrylic acid ester and 0 to 30% by mass of a monomer other than the (meth)acrylic acid ester by emulsion polymerization, from the viewpoint of comprehensive improvement in weather resistance, freezing flow retention property, pattern-retaining property, film forming stability at low temperatures, deformation resistance, adhesion property and dilution stability.

Incidentally, a resin layer other than the inner layer and the outer layer can be formed in the emulsion particle within a scope which would not hinder an object of the present invention. Accordingly, an additional inner layer can be formed inside the inner layer of the emulsion particle, or a middle layer is formed between the inner layer and the outer layer of the emulsion particle. Alternatively, an additional outer layer can be formed outside the outer layer of the emulsion particle.

For convenience of explanation, a preferred embodiment of the resin emulsion for a coating material of the present invention is described hereinafter. More specifically, there is described a resin emulsion for a coating material, wherein the inner layer is a resin layer containing the polymer (I) made of the monomer component A containing 80 to 100% by mass of a styrene-based monomer and 0 to 20% by mass of a monomer other than the styrene-based monomer by emulsion polymerization, and the outer layer is a resin layer containing the polymer (II) made of the monomer component B containing 70 to 100% by mass of a (meth)acrylic acid ester and 0 to 30% by mass of a monomer other than the (meth)acrylic acid ester by emulsion polymerization, and wherein the content of the styrene-based monomer is 10 to 55% by mass in the total monomer components used as raw materials of the emulsion particle.

The above-mentioned resin emulsion for a coating material can be obtained by, for example, forming a resin layer containing a polymer (I) made of a monomer component A containing 80 to 100% by mass of a styrene-based monomer and 0 to 20% by mass of a monomer other than the styrene-based monomer by emulsion polymerization as an inner layer, thereafter forming a resin layer containing a polymer (II) made of a monomer component B containing 70 to 100% by mass of a (meth)acrylic acid ester and 0 to 30% by mass of a monomer other than the (meth)acrylic acid ester by emulsion polymerization as an outer layer on the inner layer, and adjusting the content of the styrene-based monomer to 10 to 55% by mass in the total monomer components used as raw materials of the emulsion particle when forming the inner layer and the outer layer.

The polymer (I) for forming the above-mentioned inner layer is obtained by carrying out an emulsion polymerization of a monomer component A containing 80 to 100% by mass of a styrene-based monomer and 0 to 20% by mass of a monomer other than the styrene-based monomer.

The content of the styrene-based monomer is 80 to 100% by mass in the monomer component A from the viewpoint of comprehensive improvement in weather resistance, freezing flow retention property, pattern-retaining property, film forming stability at low temperatures, deformation resistance, adhesion property and dilution stability. Accordingly, the monomer component A can be composed only of the styrene-based monomer. In addition, the monomer component A may contain a monomer other than the styrene-based monomer within a content of 0 to 20% by mass from the viewpoint of comprehensive improvement in weather resistance, freezing flow retention property, pattern-retaining property, film forming stability at low temperatures, deformation resistance, adhesion property and dilution stability.

The styrene-based monomer means a monomer having a styrene structure. The styrene-based monomer includes, for example, styrene, α-methyl styrene, p-methylstyrene, tert-butylstyrene, chlorostyrene, vinyl toluene and the like, and the present invention is not limited only to those exemplified ones. These monomers can be used alone or in combination of at least two kinds. The styrene-based monomer may have an alkyl group such as methyl group or tert-butyl group, a group such as nitro group, nitrile group, an alkoxyl group, an acyl group, sulfonic group or hydroxyl group, or a halogen atom on its benzene ring. Among the styrene-based monomers, styrene is preferred from the viewpoint of improvement in weather resistance of a coating film.

The monomer other than the styrene-based monomer includes, for example, an ethylenically unsaturated monomer other than the styrene-based monomer.

The ethylenically unsaturated monomer other than the styrene-based monomer includes, for example, an aromatic monomer other than the styrene-based monomer, ethylenically unsaturated monomer other than the aromatic monomer and the like, and these monomers can be used alone or in combination of at least two kinds.

The aromatic monomer other than the styrene-based monomer includes, for example, an aralkyl (meth)acrylate and the like. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like. The present invention is not limited only to those exemplified ones. These monomers can be used alone or in combination of at least two kinds.

Incidentally, the term "(meth)acrylate" as described herein means "acrylate" or "methacrylate", and the term "(meth)acryl" as described herein means "acryl" or "methacryl".

The ethylenically unsaturated monomer other than the aromatic monomer includes, for example, an ethylenically unsaturated aliphatic monomer, an ethylenically unsaturated alicyclic structure-containing monomer and the like, and the present invention is not limited only to those exemplified ones.

Specific examples of the ethylenically unsaturated monomer other than the aromatic monomer include, for example, an alkyl (meth)acrylate, a hydroxyl group-containing (meth)acrylate, an acid group-containing monomer, a carbonyl group-containing ethylenically unsaturated monomer, an oxo group-containing ethylenically unsaturated monomer, a fluorine atom-containing ethylenically unsaturated monomer, a nitrogen atom-containing ethylenically unsaturated monomer, an epoxy group-containing ethylenically unsaturated monomer and the like, and the present invention is not limited only to those exemplified ones. These monomers can be used alone or in combination of at least two kinds.

The alkyl (meth)acrylate includes an alkyl (meth)acrylate having an alicyclic structure. The alkyl (meth)acrylate includes, for example, alkyl (meth)acrylates having an alkyl group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate and n-lauryl (meth)acrylate, and the like. The present invention is not limited only to those exemplified ones. These monomers can be used alone or in combination of at least two kinds. Among these alkyl (meth)acrylates, the alkyl (meth)acrylate having an alkyl group of 1 to 8 carbon atoms is preferred, and the alkyl (meth)acrylate having an alkyl group of 4 to 8 carbon atoms is more preferred, from the viewpoint of comprehensive improvement in weather resistance, freezing flow retention property, pattern-retaining property, film forming stability at low temperatures, deformation resistance, adhesion property and dilution stability.

The hydroxyl group-containing (meth)acrylate includes, for example, hydroxyalkyl (meth)acrylates having a hydroxyalkyl group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like. The present invention is not limited only to those exemplified ones. These monomers can be used alone or in combination of at least two kinds.

The acid group-containing monomer includes, for example, carboxyl group-containing aliphatic monomers such as (meth)acrylic acid, maleic acid, fumaric acid, crotonic acid, itaconic acid, citraconic acid, maleic anhydride, maleic acid monomethyl ester, maleic acid monobutyl ester, itaconic acid monomethyl ester and itaconic acid monobutyl ester, and the like. The present invention is not limited only to those exemplified ones. These monomers can be used alone or in combination of at least two kinds. Among these acid group-containing monomers, the carboxyl group-containing aliphatic monomers such as (meth)acrylic acid, maleic acid, fumaric acid, crotonic acid, itaconic acid and maleic anhydride are preferred, acrylic acid, methacrylic acid and itaconic acid are more preferred, and acrylic acid and methacrylic acid are further preferred, from the viewpoint of improvement in dispersion stability of emulsion particles.

The carbonyl group-containing ethylenically unsaturated monomer includes, for example, acrolein, formylstyrol, vinyl ethyl ketone, (meth)acryloyloxyalkylpropenal, acetonitrile (meth)acrylate, diacetone (meth)acrylate, 2-hydroxypropyl (meth)acrylate acetyl acetate, butanediol-1,4-acrylate acetyl acetate, 2-(acetoacetoxy)ethyl (meth)acrylate and the like, and the present invention is not limited only to those exemplified ones. These monomers can be used alone or in combination of at least two kinds.

The oxo group-containing ethylenically unsaturated monomer includes, for example, (di)ethylene glycol (methoxy) (meth)methacrylates such as ethylene glycol (meth)acrylate, ethylene glycol methoxy (meth)acrylate, diethylene glycol (meth)acrylate and diethylene glycol methoxy (meth)acrylate, and the present invention is not limited only to those exemplified ones. These monomers can be used alone or in combination of at least two kinds.

The fluorine atom-containing ethylenically unsaturated monomer includes, for example, fluoroalkyl (meth)acrylates having a fluoroalkyl group of 2 to 6 carbon atoms, such as trifluoroethyl (meth)acrylate, tetrafluoropropyl (meth)acrylate and octafluoro pentyl (meth)acrylate, and the like. The present invention is not limited only to those exemplified ones. These monomers can be used alone or in combination of at least two kinds.

The nitrogen atom-containing ethylenically unsaturated monomer includes, for example, acrylamide compounds such as (meth)acrylamide, N,N-dimethylaminopropyl acrylamide and diacetone acrylamide, nitrogen atom-containing (meth)acrylates such as dimethylaminoethyl (meth)acrylate and diethylaminoethyl (meth)acrylate, N-vinyl pyrrolidone, and the like. The present invention is not limited only to those exemplified ones. These monomers can be used alone or in combination of at least two kinds.

The epoxy group-containing ethylenically unsaturated monomer includes, for example, epoxy group-containing (meth)acrylates such as glycidyl (meth)acrylate, and the like. The present invention is not limited only to those exemplified ones. These monomers can be used alone or in combination of at least two kinds.

Accordingly, the monomer other than the styrene-based monomer includes, for example, the aromatic monomer other than the styrene-based monomer, the alkyl (meth)acrylate, the hydroxyl group-containing (meth)acrylate, the acid group-containing monomer, the oxo group-containing ethylenically unsaturated monomer, the fluorine atom-containing ethylenically unsaturated monomer, the nitrogen atom-containing ethylenically unsaturated monomers, the epoxy group-containing ethylenically unsaturated monomer, and the like. These monomers can be used alone or in combination of at least two kinds.

Among the monomers other than the styrene-based monomer, the ethylenically unsaturated monomer is preferred; at least one ethylenically unsaturated monomer selected from the group consisting of the alkyl (meth)acrylate and (meth)acrylic acid is more preferred; at least one ethylenically unsaturated monomer selected from the group consisting of the alkyl (meth)acrylates having an alkyl group of 1 to 8 carbon atoms and (meth)acrylic acid is further preferred; and at least one ethylenically unsaturated monomer selected from the group consisting of methyl (meth)acrylate, tert-butyl (meth)acrylate, 2-ethylhexyl (meth)acrylate, cyclohexyl (meth)acrylate and (meth)acrylic acid is furthermore preferred, from the viewpoint of comprehensive improvement in weather resistance, freezing flow retention property, pattern-retaining property, film forming stability at low temperatures, deformation resistance, adhesion property and dilution stability.

As a method for carrying out the emulsion polymerization of the monomer component A, there can be cited, for example, a method which includes dissolving an emulsifier in a medium such as water or an aqueous medium containing water and a water-soluble organic solvent such as methanol, and adding dropwise the monomer component A and a polymerization initiator to the resulting solution with stirring, a method which includes adding the monomer component A, which is previously emulsified with an emulsifier and water, to water or the aqueous medium, and the like. The present invention is not limited only to those methods. Incidentally, it is preferred that the amount of the medium is properly adjusted in accordance with the content of non-volatile components contained in the resulting resin emulsion.

The emulsifier includes, for example, an anionic emulsifier, a nonionic emulsifier, a cationic emulsifier, an amphoteric emulsifier, a polymeric emulsifier, and the like. These emulsifiers can be used alone or in combination of at least two kinds. When at least two kinds of the emulsifier are used in combination, for example, a combination of the anionic emulsifier and the nonionic emulsifier can be employed.

The anionic emulsifier, includes, for example, alkyl sulfate salts such as ammonium dodecyl sulfate and sodium dodecyl sulfate; alkyl sulfonate salts such as ammonium dodecyl sulfonate and sodium dodecyl sulfonate; alkyl aryl sulfonate salts such as ammonium dodecylbenzene sulfonate and sodium dodecyl naphthalene sulfonate; polyoxyethylene alkyl sulfate salts; polyoxyethylene alkyl aryl sulfate salts; dialkyl sulfosuccinates; arylsulfonic acid-formaldehyde condensates; fatty acid salts such as ammonium laurate and sodium stearate; and the like. The present invention is not limited only to those exemplified ones.

The nonionic emulsifier includes, for example, a polyoxyethylene alkyl ether, a polyoxyethylene alkyl aryl ether, a condensate of polyethylene glycol and polypropylene glycol, a sorbitan fatty acid ester, a polyoxyethylene sorbitan fatty acid ester, a fatty acid monoglyceride, a condensate of ethylene oxide and an aliphatic amine, and the like. The present invention is not limited only to those exemplified ones.

The cationic emulsifier includes, for example, alkylammonium salts such as dodecyl ammonium chloride, and the like. The present invention is not limited only to those exemplified ones.

The amphoteric emulsifier, includes, for example, betaine ester emulsifier, and the like. The present invention is not limited only to those exemplified ones.

The polymer emulsifiers include, for example, poly (meth)acrylic acid salts such as sodium polyacrylate; polyvinyl alcohol; polyvinyl pyrrolidone; polyhydroxyalkyl (meth)acrylates such as polyhydroxyethyl acrylate; a copolymer of which copolymerizable component includes at least one monomer which constitutes these polymers; and the like. The present invention is not limited only to those exemplified ones.

In addition, as the above-mentioned emulsifier, an emulsifier having a polymerizable group, that is, a so-called reactive emulsifier is preferred from the viewpoint of comprehensive improvement in weather resistance, freezing flow retention property, pattern-retaining property, film forming stability at low temperatures, deformation resistance, adhesion property and dilution stability, and a non-nonylphenyl type emulsifier is preferred from the viewpoint of environmental protection.

The reactive emulsifier includes, for example, a propenylalkyl sulfosuccinic acid salt, (meth)acrylic acid polyoxyethylene sulfonate salt, (meth)acrylic acid polyoxyethylene phosphonate salt [for example, product name of Eleminol RS-30 manufactured by Sanyo Chemical Industries, Ltd., and the like], a polyoxyethylene alkyl propenyl phenyl ether sulfonate salt [for example, product name of Aqualon HS-10 manufactured by DKS Co. Ltd., and the like], a sulfonate salt of allyloxymethyl alkyloxy polyoxyethylene [for example, product name of Aqualon KH-10 manufactured by DKS Co. Ltd., and the like], a sulfonate salt of allyloxymethyl nonyl phenoxyethyl hydroxypolyoxyethylene [for example, product name of ADEKA REASOAP SE-10 manufactured by ADEKA Corporation, and the like], an allyloxymethyl alkoxyethyl hydroxypolyoxyethylene sulfate salt [for example, product name of ADEKA REASOAP SR-10 or ADEKA REASOAP SR-30 manufactured by ADEKA Corporation, and the like], a bis(polyoxyethylene polycyclic phenyl ether) methacrylated sulfonate salt [for example, product name of Antox MS-60 manufactured by NIPPON NYUKAZAI CO., LTD., and the like], an allyloxymethyl alkoxyethyl hydroxypolyoxyethylene [for example, product name of ADEKA REASOAP ER-20 manufactured by ADEKA Corporation, and the like], a polyoxyethylene alkylpropenylphenyl ether[for example, product name of Aqualon RN-20 manufactured by DKS Co. Ltd., and the like], allyloxymethyl nonylphenoxyethyl hydroxypolyoxyethylene[for example, product name of ADEKA REASOAP NE-20 manufactured by ADEKA Corporation, and the like], and the like. The present invention is not limited only to those exemplified ones.

The amount of the emulsifier per 100 parts by mass of the monomer component A is preferably 0.5 parts by mass or more, more preferably 1 part by mass or more, further preferably 2 parts by mass or more, and even more preferably 3 parts by mass or more, from the viewpoint of improvement in polymerization stability, and is preferably 10 parts by mass or less, more preferably 8 parts by mass or less, further preferably 6 parts by mass or less, and even more preferably 5 parts by mass or less, from the viewpoint of comprehensive improvement in weather resistance, freezing flow retention property, pattern-retaining property, film forming stability at low temperatures, deformation resistance, adhesion property and dilution stability.

The polymerization initiator includes, for example, azo compounds such as azobisisobutyronitrile, 2,2-azobis(2-methylbutyronitrile), 2,2-azobis(2,4-dimethylvaleronitrile), 2,2-azobis(2-diaminopropane) hydrochloride, 4,4-azobis(4-cyanovaleric acid) and 2,2-azobis(2-methylpropionamidine); persulfates such as ammonium persulfate, sodium persulfate and potassium persulfate; peroxides such as hydrogen peroxide, benzoyl peroxide, p-chlorobenzoyl peroxide, lauroyl peroxide and ammonium peroxide, and the like. The present invention is not limited only to those exemplified ones. These polymerization initiators can be used alone or in combination of at least two kinds.

The amount of the polymerization initiator per 100 parts by mass of the monomer component A is preferably 0.05 parts by mass or more, and more preferably 0.1 parts by mass or more, from the viewpoint of increase in polymerization rate and reduction of a residual amount of the unreacted monomer component A, and is preferably 1 part by mass or less, and more preferably 0.5 parts by mass or less, from the viewpoint of improvement in water penetration resistance of a coating film.

A method for adding the polymerization initiator is not particularly limited. The method for adding the polymerization initiator includes, for example, a method for adding the polymerization initiator at a time, a method for adding the polymerization initiator in a divided amount, a method for continuously adding the polymerization initiator dropwise, and the like. In addition, a part of the polymerization initiator can be added before or after the completion of addition of the monomer component A to a reaction system from the viewpoint of acceleration of the polymerization reaction.

Incidentally, a reducing agent such as sodium bisulfite, or a decomposition agent of the polymerization initiator such as a transition metal salt such as ferrous sulfate can be added to the reaction system in an appropriate amount in order to promote the decomposition of the polymerization initiator.

In addition, for example, an additive such as a chain transfer agent such as a compound having a thiol group such as tert-dodecyl mercaptan, a pH buffering agent, a chelating agent or a film-forming auxiliary agent can be added to the reaction system as occasion demands. The amount of the additive cannot be absolutely determined, because the amount differs depending on the kind of the additive, and the amount is usually preferably 0.01 to 5 parts by mass, and more preferably 0.1 to 3 parts by mass per 100 parts by mass of the monomer component A.

The atmosphere where the emulsion polymerization of the monomer component A is carried out is not particularly limited. It is preferred that the atmosphere is an inert gas such as nitrogen gas or argon gas from the viewpoint of increase in efficiency of the polymerization initiator.

When the emulsion polymerization of the monomer component A is carried out, the polymerization temperature is not particularly limited, and is usually preferably from 50 to 100° C., and more preferably from 60 to 95° C. The polymerization temperature can be constant or changed during the polymerization reaction.

The polymerization period of time for carrying out the emulsion polymerization of the monomer component A is not particularly limited, and can be appropriately adjusted in accordance with the progress of the polymerization reaction. The polymerization period of time is usually 2 to 9 hours or so.

When the emulsion polymerization of the monomer component A is carried out as described above, the polymer (I) which forms an inner layer is obtained in the form of emulsion particles.

The polymer (I) may have a crosslinked structure. The weight average molecular weight of the polymer (I) is preferably 100000 or more, more preferably 300000 or more, further preferably 550000 or more, and particularly preferably 600000 or more, from the viewpoint of improvement in water penetration resistance of a coating film in any of the case where the polymer (I) has a crosslinked structure and the case where the polymer (I) does not have a crosslinked structure. The upper limit of the weight average molecular weight of the polymer (I) is not particularly limited when the polymer (I) has a crosslinked structure, because it is difficult to determine the weight average molecular weight. When the polymer (I) does not have a crosslinked structure, the upper limit of the weight average molecular weight is preferably 5000000 or less from the viewpoint of improvement in film forming property.

Incidentally, the weight average molecular weight as described herein means a weight average molecular weight (in terms of polystyrene) as determined by using a gel permeation chromatography [manufactured by Tosoh Corporation, product No.: HLC-8120GPC, a column of TSKgel G-5000HXL is connected with a column of TSKgel GMHXL-L in series].

After the formation of the inner layer containing the polymer (I), an outer layer containing the polymer (II) is formed on the inner layer by carrying out an emulsion polymerization of the monomer component B containing 70 to 100% by mass of the (meth)acrylic acid ester and 0 to 30% by mass of the monomer other than the (meth)acrylic acid ester.

When the emulsion polymerization of the monomer component B is carried out, it is preferred that the emulsion polymerization of the monomer component B is carried out after the polymerization reaction rate in the emulsion polymerization of the monomer component A attains to 90% or more, and preferably 95% or more, from the viewpoint of formation of a layer separation structure in the emulsion particle.

Incidentally, after the formation of the inner layer containing the polymer W, a resin layer containing another polymer can be formed as occasion demands prior to the formation of the outer layer containing the polymer (II) within a scope which would not hinder an object of the present invention.

Accordingly, in the method for producing the resin emulsion for a coating material of the present invention, after the formation of the inner layer containing the polymer (I), a process for forming a resin layer containing another polymer can be included as occasion demands prior to the formation of the outer layer containing the polymer (II) within a scope which would not hinder an object of the present invention.

The (meth)acrylic acid ester used in the monomer component B includes, for example, an alkyl (meth)acrylate, a hydroxyl group-containing (meth)acrylate, an oxo group-containing (meth)acrylate, a fluorine atom-containing (meth)acrylate, a nitrogen atom-containing (meth)acrylate, an epoxy group-containing (meth)acrylate, a (meth)acrylate-based silane-group containing monomer, an aralkyl (meth)acrylate, a (meth)acrylate-based ultraviolet-stable monomer, a (meth)acrylate-based ultraviolet-absorbing monomer and the like, and the present invention is not limited only to those exemplified ones. These monomers can be used alone or in combination of at least two kinds.

The alkyl (meth)acrylate includes, for example, alkyl (meth)acrylates having an alkyl group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate and 2-(acetoacetoxy)ethyl (meth)acrylate, and the like. The present invention is not limited only to those exemplified ones. These monomers can be used alone or in combination of at least two kinds.

Among the alkyl (meth)acrylates, the alkyl (meth)acrylates having an alkyl group of 1 to 8 carbon atoms is preferred, and at least one alkyl (meth)acrylate selected from the group consisting of methyl (meth)acrylate, tert-butyl (meth)acrylate, 2-ethylhexyl (meth)acrylate and cyclohexyl (meth)acrylate is more preferred, from the viewpoint of comprehensive improvement in weather resistance, freezing flow retention property, pattern-retaining property, film forming stability at low temperatures, deformation resistance, adhesion property and dilution stability. These monomers can be used alone or in combination of at least two kinds.

The hydroxyl group-containing (meth)acrylate includes, for example, hydroxyalkyl (meth)acrylates having a hydroxyalkyl group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like. The present invention is not limited only to those exemplified ones. These monomers can be used alone or in combination of at least two kinds.

The oxo group-containing (meth)acrylate includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like. The present invention is not limited only to those exemplified ones. These monomers can be used alone or in combination of at least two kinds.

The fluorine atom-containing (meth)acrylate includes, for example, fluoroalkyl (meth)acrylates having a fluoroalkyl group of 2 to 6 carbon atoms, such as trifluoroethyl (meth)acrylate, tetrafluoropropyl (meth)acrylate and octafluoropentyl (meth)acrylate, and the like. The present invention is not limited only to those exemplified ones. These monomers can be used alone or in combination of at least two kinds.

The nitrogen atom-containing (meth)acrylate includes, for example, dimethylaminoethyl (meth)acrylate, diethylaminoethyl (meth)acrylate and the like, and the present invention is not limited only to those exemplified ones. These monomers can be used alone or in combination of at least two kinds.

The epoxy group-containing (meth)acrylate includes, for example, glycidyl (meth)acrylate and the like, and the present invention is not limited only to those exemplified ones. These monomers can be used alone or in combination of at least two kinds.

The (meth)acrylate-based silane group-containing monomer includes, for example, gamma-(meth)acryloyloxypropyl trimethoxysilane, gamma-(meth)acryloyloxypropyl hydroxysilane, gamma-(meth)acryloyloxypropyl methylhydroxypropyl silane and the like, and the present invention is not limited only to those exemplified ones. These monomers can be used alone or in combination of at least two kinds.

The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like. The present invention is not limited only to those exemplified ones. These monomers can be used alone or in combination of at least two kinds.

The (meth)acrylate-based ultraviolet-stable monomer includes, for example, 2,2,6,6-tetramethylpiperidine-4-(meth)acrylate, 1,2,2,6,6-pentamethylpiperidine-4-(meth)acrylate, 2,2,6,6-tetramethylpiperidine-4-cyano-4-(meth)acrylate and the like, and the present invention is not limited only to those exemplified ones. These monomers can be used alone or in combination of at least two kinds.

The (meth)acrylate ultraviolet absorbing monomer includes, for example, a benzotriazole ultraviolet absorbing monomer, a benzophenone ultraviolet absorbing monomer and the like, and the present invention is not limited only to those exemplified ones. These monomers can be used alone or in combination of at least two kinds.

The (meth)acrylate-based ultraviolet-absorbing monomer includes, for example, 2-[2'-hydroxy-5'-(meth)acryloyloxy methylphenyl]-2H-benzotriazole, 2-[2'-hydroxy-5'-(meth)acryloyloxyethylphenyl]-2H-benzotriazole, 2-[2'-hydroxy-5'-(meth)acryloyloxy-methylphenyl]-5-tert-butyl-2H-benzotriazole, 2-[2'-hydroxy-5'-(meth)acryloyloxypropylphenyl]-2H-benzotriazole, 2-[2'-hydroxy-5'-(meth)acryloyloxyhexylphenyl]-2H-benzotriazole, 2-[2'-hydroxy-3'-tert-butyl-5'-(meth)acryloyloxyethylphenyl]-2H-benzotriazole, 2-[2'-hydroxy-3'-tert-butyl-5'-(meth)acryloyloxyethylphenyl]-5-chloro-2H-benzotriazole, 2-[2'-hydroxy-5'-tert-butyl-3'-(meth)acryloyloxyethyl phenyl]-2H-benzotriazole, 2-[2'-hydroxy-5'-(meth)acryloyloxyethylphenyl]-5-chloro-2H-benzotriazole, 2-[2'-hydroxy-5'-(meth)acryloyloxyethylphenyl]-5-cyano-2H-benzotriazole, 2-[2'-hydroxy-5'-(meth)acryloyloxyethylphenyl]-5-tert-butyl-2H-benzotriazole, 2-[2'-hydroxy-5'-(β-(meth)acryloyloxyethoxy)-3'-tert-butylphenyl]-4-tert-butyl-2H-benzotriazole, 2-hydroxy-4-(meth)acryloyloxy benzophenone, 2-hydroxy-4-[2-hydroxy-3-(meth)acryloyloxy]propoxy benzophenone, 2-hydroxy-4-[2-(meth)acryloyloxy]ethoxy benzophenone, 2-hydroxy-4-[3-(meth)acryloyloxy-2-hydroxypropoxy] benzophenone, 2-hydroxy-3-tert-butyl-4-[2-(meth)acryloyloxy]butoxy benzophenone and the like, and the present invention is not limited only to those exemplified ones. These monomers can be used alone or in combination of at least two kinds.

Among the (meth)acrylic acid esters, the alkyl (meth)acrylate, the (meth)acrylate-based silane group-containing monomer and the (meth)acrylate-based ultraviolet-stable monomer are preferred, and the alkyl (meth)acrylate having an ester moiety of 1 to 8 carbon atoms, the (meth)acrylate-based silane group-containing monomer and the (meth)acrylate-based ultraviolet-stable monomer are more preferred, from the viewpoint of comprehensive improvement in weather resistance, freezing flow retention property, pattern-retaining property, film forming stability at low temperatures, deformation resistance, adhesion property and dilution stability.

The content of the alkyl (meth)acrylate in the acrylic acid ester is preferably 85% by mass or more, and more preferably 90% by mass or more, from the viewpoint of comprehensive improvement in weather resistance, freezing flow retention property, pattern-retaining property, film forming stability at low temperatures, deformation resistance, adhesion property and dilution stability, and is preferably 100% by mass or less from the viewpoint of comprehensive improvement in weather resistance, freezing flow retention property, pattern-retaining property, film forming stability at low temperatures, deformation resistance, adhesion property and dilution stability. Incidentally, when the (meth)acrylic acid ester other than the alkyl (meth)acrylate is used in the (meth)acrylic acid ester, the content of the alkyl (meth)acrylate in the (meth)acrylic acid ester is preferably 99% by mass or less, and more preferably 98% by mass or less.

The content of the (meth)acrylic acid ester other than the alkyl (meth)acrylate in the alkyl (meth)acrylate is preferably 1% by mass or more, and more preferably 2% by mass or more, from the viewpoint of sufficient exhibition of properties based on the (meth)acrylic acid ester other than the alkyl (meth)acrylate, and is preferably 15% by mass or less, and more preferably 10% by mass or less, from the viewpoint of comprehensive improvement in weather resistance, freezing flow retention property, pattern-retaining property, film forming stability at low temperatures, deformation resistance, adhesion property and dilution stability.

In addition, the content of the (meth)acrylate-based ultraviolet-stable monomer in the (meth)acrylic acid ester is preferably 0.1% by mass or more, more preferably 0.3% by mass or more, further preferably 0.5% by mass or more, and even more preferably 1% by mass or more, from the viewpoint of comprehensive improvement in weather resistance, freezing flow retention property, pattern-retaining property, film forming stability at low temperatures, deformation resistance, adhesion property and dilution stability, and is preferably 10% by mass or less, and more preferably 8% by mass or less, from the viewpoint of comprehensive improvement in weather resistance, freezing flow retention property, pattern-retaining property, film forming stability at low temperatures, deformation resistance, adhesion property and dilution stability.

The content of the (meth)acrylic acid ester in the monomer component B is 70% by mass or more, preferably 75% by mass or more, and more preferably 80% by mass or more, from the viewpoint of comprehensive improvement in weather resistance, freezing flow retention property, pattern-retaining property, film forming stability at low temperatures, deformation resistance, adhesion property and dilution stability, and is 100% by mass or less from the viewpoint of comprehensive improvement in weather resistance, freezing flow retention property, pattern-retaining property, film forming stability at low temperatures, deformation resistance, adhesion property and dilution stability. Accordingly, the monomer component B can be composed only of the (meth)acrylic acid ester, and may contain a monomer other than the (meth)acrylic acid ester. When the monomer other than the (meth)acrylic acid ester is used, the content of the monomer other than the (meth)acrylic acid ester in the monomer component B is from 0 to 30% by mass, preferably from 0 to 25% by mass, and more preferably from 0 to 20% by mass, from the viewpoint of comprehensive improvement in weather resistance, freezing flow retention property, pattern-retaining property, film forming stability at low temperatures, deformation resistance, adhesion property and dilution stability.

The other monomer includes, for example, an aromatic monomer other than the aromatic (meth)acrylate such as an aralkyl (meth)acrylate, an acid group-containing monomer, an amido group-containing monomer, a silane group-containing monomer other than the (meth)acrylate-based silane group-containing monomer, an ultraviolet-stable monomer other than the (meth)acrylate-based ultraviolet-stable monomer, an ultraviolet-absorbing monomer other than the (meth)acrylate-based ultraviolet-absorbing monomer and the like, and the present invention is not limited only to those exemplified ones. These monomers can be used alone or in combination of at least two kinds.

The aromatic monomer other than the aromatic (meth)acrylate includes, for example, styrene, α-methylstyrene, p-methylstyrene, tert-butylstyrene, chlorostyrene, vinyl toluene and the like, and the present invention is not limited only to those exemplified ones. These monomers can be used alone or in combination of at least two kinds. The styrene-based monomer may have an alkyl group such as methyl group or tert-butyl group, a functional group such as nitro group, nitrile group, an alkoxyl group, an acyl group, sulfonic group or hydroxyl group, or a halogen atom on its benzene ring.

The acid group-containing monomer includes, for example, carboxyl group-containing aliphatic monomers such as (meth)acrylic acid, maleic acid, fumaric acid, crotonic acid, itaconic acid, citraconic acid, maleic anhydride, maleic acid monomethyl ester, maleic acid monobutyl ester, itaconic acid monomethyl ester and itaconic acid monobutyl ester, carboxyl group-containing aliphatic monomers such as vinyl benzoate, and the like. The present invention is not limited only to those exemplified ones. These monomers can be used alone or in combination of at least two kinds. Among these acid group-containing monomers, the carboxyl group-containing aliphatic monomers such as (meth)acrylic acid, maleic acid, fumaric acid, crotonic acid, itaconic acid and maleic anhydride are preferred; acrylic acid, methacrylic acid and itaconic acid are more preferred, and acrylic acid and methacrylic acid are further preferred, from the viewpoint of improvement in dispersion stability of emulsion particles.

The amido group-containing monomer includes, for example, acrylamide compounds such as (meth)acrylamide, N,N-dimethylaminopropyl acrylamide and diacetone acrylamide, nitrogen atom-containing (meth)acrylates, N-vinylpyrrolidone, and the like. The present invention is not limited only to those exemplified ones. These monomers can be used alone or in combination of at least two kinds.

The silane group-containing monomer other than the (meth)acrylate-based silane group-containing monomer includes, for example, vinyltrimethoxysilane, vinyltriethoxysilane, vinyl tri(methoxyethoxy)silane, 2-styrylethyltrimethoxysilane, vinyltrichlorosilane and the like, and the present invention is not limited only to those exemplified ones. These monomers can be used alone or in combination of at least two kinds.

The ultraviolet-stable monomer other than the (meth)acrylate-based ultraviolet-stable monomer includes, for example, 4-(meth)acryloylamino-2,2,6,6-tetramethylpiperidine, 4-(meth)acryloyl-1-methoxy-2,2,6,6-tetramethylpiperidine, 1-(meth)acryloyl-4-(meth)acryloylamino-2,2,6,6-tetramethylpiperidine, 4-crotonoylamino-2,2,6,6-tetramethylpiperidine, 4-(meth)acryloylamino-1,2,2,6,6-pentamethylpiperidine, 4-cyano-4-(meth)acryloylamino-2,2,6,6-tetramethylpiperidine, 4-crotonoyloxy-2,2,6,6-tetramethylpiperidine, 1-(meth)acryloyl-4-cyano-4-(meth)acryloylamino-2,2,6,6-tetramethylpiperidine, 1-crotonoyl-4-crotonoyloxy-2,2,6,6-tetramethylpiperidine and the like, and the present invention is not limited only to those exemplified ones. These monomers can be used alone or in combination of at least two kinds.

The ultraviolet absorbing monomer other than the (meth)acrylate ultraviolet absorbing monomer includes, for example, 2-[2'-hydroxy-5'-(meth)acryloylaminomethyl-5'-tert-octylphenyl]-2H-benzotriazole and the like, and the present invention is not limited only to those exemplified ones. These monomers can be used alone or in combination of at least two kinds.

Among the above-mentioned other monomers, the aromatic monomer other than the aromatic (meth)acrylate monomer is preferred; the styrene-based monomer is more preferred; and styrene is further preferred, from the viewpoint of comprehensive improvement in weather resistance, freezing flow retention property, pattern-retaining property, film forming stability at low temperatures, deformation resistance, adhesion property and dilution stability.

The content of the monomer other than the (meth)acrylic acid ester in the monomer component B is 30% by mass or less, preferably 25% by mass or less, and further preferably 20% by mass or less, from the viewpoint of comprehensive improvement in weather resistance, freezing flow retention property, pattern-retaining property, film forming stability at low temperatures, deformation resistance, adhesion property and dilution stability, and its lower limit is 0% by mass.

a method and conditions for carrying out the emulsion polymerization of the monomer component B can be the same as the method and the conditions for carrying out the emulsion polymerization of the monomer component A.

When the emulsion polymerization of the monomer component B is carried out as mentioned above, emulsion particles in which a resin layer containing the polymer layer (II) is formed on the surface of the above-mentioned inner layer can be obtained. Incidentally, a surface layer containing another polymer can be further formed on the surface of the outer layer containing polymer (II) as occasion demands within a scope which would not hinder an object of the present invention.

The polymer (II) may have a crosslinked structure. The weight average molecular weight of the polymer (II) is preferably 100000 or more, more preferably 300000 or more, further preferably 550000 or more, and particularly preferably 600000 or more, from the viewpoint of improvement in water penetration resistance of a coating film in any of the case where the polymer (II) has a crosslinked structure and the case where the polymer (II) does not have a crosslinked structure. The upper limit of the weight average molecular weight of the polymer (II) is not particularly limited when the polymer (II) has a crosslinked structure, because it is difficult to determine the weight average molecular weight of the polymer (II). When the polymer (II) does not have a crosslinked structure, the upper limit is preferably 1000000 or less, and more preferably 700000 or less, from the viewpoint of improvement in film forming property.

In the present invention, the content of the styrene-based monomer in the total monomer components used as a raw material of the emulsion particle is 10% by mass or more, preferably 15% by mass or more, and more preferably 20% by mass or more, from the viewpoint of comprehensive improvement in weather resistance, freezing flow retention property, pattern-retaining property, film forming stability at low temperatures, deformation resistance, adhesion property and dilution stability, and is 55% by mass or less, preferably 50% by mass or less, more preferably 45% by mass or less, and further preferably 40% by mass or less, from the viewpoint of comprehensive improvement in weather resistance, freezing flow retention property, pattern-retaining property, film forming stability at low temperatures, deformation resistance, adhesion property and dilution stability. Accordingly, the content of the monomer other than the styrene-based monomer in the total monomer components used as a raw material of the emulsion particle is 45% by mass or more, preferably 50% by mass or more, more preferably 55% by mass or more, and further preferably 60% by mass or more, from the viewpoint of comprehensive improvement in weather resistance, freezing flow retention property, pattern-retaining property, film forming stability at low temperatures, deformation resistance, adhesion property and dilution stability, and is 90% by mass or less, preferably 85% by mass or less, and more preferably 80% by mass or less, from the viewpoint of comprehensive improvement in weather resistance, freezing flow retention property, pattern-retaining property, film forming stability at low temperatures, deformation resistance, adhesion property and dilution stability.

In addition, the acid group-containing monomer in the total monomer components used as a raw material of the emulsion particles is preferably 0.1% by mass or more, more preferably 0.2% by mass or more, and further preferably 0.3% by mass or more, from the viewpoint of comprehensive improvement in weather resistance, freezing flow retention property, pattern-retaining property, film forming stability at low temperatures, deformation resistance, adhesion property and dilution stability, and is preferably 10% by mass or less, more preferably 8% by mass or less, and further preferably 5% by mass or less, from the viewpoint of comprehensive improvement in weather resistance, freezing flow retention property, pattern-retaining property, film forming stability at low temperatures, deformation resistance, adhesion property and dilution stability.

It is preferred that the acid group-containing monomer is contained in the monomer component used as a raw material of the resin layer for constituting the outer layer of the emulsion particle from the viewpoint of improvement in mechanical stability of the resin emulsion, miscibility with pigment and dilution stability, and adhesion property of a formed coating film to a substrate. The content of the acid group-containing monomer in the monomer component used as a raw material of the resin layer for constituting the outer layer is preferably 0.5% by mass or more, more preferably 1% by mass or more, and further preferably 3% by mass or more, from the viewpoint of improvement in mechanical stability of the resin emulsion, miscibility with pigment and dilution stability, and adhesion property of a formed coating film to a substrate, and is preferably 10% by mass or less, and more preferably 8% by mass or less, from the viewpoint of improvement in water resistance, weather resistance and pattern-retaining property of a formed coating film.

In the emulsion particles obtained as described above, the glass transition temperature of the polymer (I) is preferably 60° C. or more, more preferably 65° C., or more, and further preferably 70° C. or more, from the viewpoint of comprehensive improvement in weather resistance, freezing flow retention property, pattern-retaining property, film forming stability at low temperatures, deformation resistance, adhesion property and dilution stability, and is preferably 120° C. or less, more preferably 115° C. or less, and further preferably 110° C. or less, from the viewpoint of comprehensive improvement in weather resistance, freezing flow retention property, pattern-retaining property, film forming stability at low temperatures, deformation resistance, adhesion property and dilution stability. The glass transition temperature of the polymer (I) can be easily controlled by adjusting the composition of the monomers used in the monomer component.

The glass transition temperature of the polymer (II) is preferably −25° C. or more, more preferably −20° C., or more, and further preferably −15° C. or more, from the viewpoint of comprehensive improvement in weather resistance, freezing flow retention property, pattern-retaining property, film forming stability at low temperatures, deformation resistance, adhesion property and dilution stability, and is preferably 40° C. or less, and more preferably 35° C. or less, from the viewpoint of comprehensive improvement in weather resistance, freezing flow retention property, pattern-retaining property, film forming stability at low temperatures, deformation resistance, adhesion property and dilution stability. The glass transition temperature of the polymer (II) can be easily controlled by adjusting the composition of the monomers used in the monomer component.

In addition, the glass transition temperature of the emulsion particle itself, in other words, the glass transition temperature of the whole particle is preferably −5° C. or higher, more preferably 5° C. or higher, and further preferably 15° C. or higher, from the viewpoint of comprehensive improvement in weather resistance, freezing flow retention property, pattern-retaining property, film forming stability at low temperatures, deformation resistance, adhesion property and dilution stability, and is preferably 65° C. or lower, more preferably 60° C. or lower, and further preferably 55° C. or lower, from the viewpoint of comprehensive improvement in weather resistance, freezing flow retention property, pattern-retaining property, film forming stability at low temperatures, deformation resistance, adhesion property and dilution stability.

Incidentally, the glass transition temperature of a polymer used herein means a temperature as determined by the Fox equation represented by the equation:

$$1/Tg = \Sigma(Wm/Tgm)/100$$

wherein Win is the content (% by weight) of a monomer "m" in a monomer component used as a raw material of the polymer; and Tgm is a glass transition temperature (absolute temperature: K) of a homopolymer made of the monomer "m", in which the glass transition temperature of the homopolymer is a glass transition temperature of a homopolymer made of a monomer which is used in the monomer component as a raw material of the polymer.

The glass transition temperature of a polymer is, for example, 100° C. for a homopolymer of styrene, −70° C. for a homopolymer of 2-ethylhexyl acrylate, 130° C. for a homopolymer of methacrylic acid, 105° C. for a homopolymer of methyl methacrylate, 130° C. for a homopolymer of 2,2,6,6-tetramethylpiperidine-4-methacrylate, 70° C. for a homopolymer of gamma-methacryloxypropyltrimethoxysilane, 95° C. for a homopolymer of acrylic acid, 83° C. for a homopolymer of cyclohexyl methacrylate, 20° C. for a homopolymer of n-butyl methacrylate, −56° C. for a homopolymer of n-butyl acrylate, and 130° C. for a homopolymer of 1,2,2,6,6-pentamethylpiperidine-4-methacrylate, respectively.

The glass transition temperature of the polymer is a value as determined by the above-mentioned Fox equation. It is preferred that an actual value of the glass transition temperature of the polymer is the same as a value as determined by the above-mentioned Fox equation. The actual value of the glass transition temperature of the polymer can be determined by, for example, measuring a differential scanning calorimetry of the polymer.

The glass transition temperature of the polymer as described herein means a glass transition temperature as determined by the above-mentioned equation unless otherwise noted. Incidentally, as to a monomer of which glass transition temperature is unknown, such as a special monomer or a polyfunctional monomer, when the total content of the monomer of which glass transition temperature is unknown is 10% by mass or less in the monomer component, the glass transition temperature can be determined by using only the monomer of which glass transition temperature has been found. When the total content of the monomer of which the glass transition temperature is unknown exceeds 10% by mass in the monomer component, the glass transition temperature can be determined by means of differential scanning calorimetry (DSC), differential thermal analysis (DTA), thermomechanical analysis (TMA) or the like.

As an apparatus for determining the differential scanning calorimeter, there can be cited, for example, an apparatus commercially available from Seiko Instruments Inc. under the product number of DSC220C, and the like. In addition, when the differential scanning calorimetry is determined, there is no particular limitation in a method for drawing a differential scanning calorimetry (DSC) curve, a method for obtaining a first derivative curve from the differential scanning calorimetry (DSC) curve, a method for smoothing, a method for determining a targeted peak temperature, and the like. For example, when the above-mentioned apparatus for determining the differential scanning calorimeter is used, a drawing can be made from the data obtained by the apparatus. At that time, analysis software for performing a mathematical process can be used. The analysis software includes, for example, analysis software commercially available from Seiko Instruments Inc. under the product number of EXSTAR6000 and the like, and the present invention is not limited only to the exemplified one.

Incidentally, the peak temperature obtained in the above may include an error within a range of ±5° C. or so due to drawing.

It is preferred that the solubility parameter (hereinafter referred to as SP value) of the polymer (II) is higher than the SP value of the polymer (I) from the viewpoint of formation of a layer separation structure in the emulsion particle. In addition, it is preferred that the difference between the SP value of the polymer (I) and the SP value of the polymer (II) is lager from the viewpoint of formation of a layer separation structure in the emulsion particle. According to the present invention, since the emulsion particle includes the polymer (I) in which the styrene-based monomer showing a low SP value is used in a large amount, and the polymer (II) having a high SP value, the emulsion particle has an ideal structure in which the inner layer is clearly separated from the outer layer.

The SP value is a value as defined by the regular solution theory which is introduced by Hildebrand, and is used as a measure of solubility of the two-component solution. In general, substances with close SP values with each other tend to mix with each other. Accordingly, the SP value has been also used as a measure to judge the ease of mixing of a solute with a solvent.

The mass ratio of the polymer (I) to the polymer (II) [polymer (I)/polymer (II)] is preferably 15/85 or more, more preferably 20/80 or more, and further preferably 25/75 or more, from the viewpoint of comprehensive improvement in weather resistance, freezing flow retention property, pattern-retaining property, film forming stability at low temperatures, deformation resistance, adhesion property and dilution stability, and is preferably 85/15 or less, more preferably 80/20 or less, and further preferably 75/25 or less, from the viewpoint of comprehensive improvement in weather resistance, freezing flow retention property, pattern-retaining property, film forming stability at low temperatures, deformation resistance, adhesion property and dilution stability.

The total content of the polymer (I) and the polymer (II) in the emulsion particle is 30% by mass or more, preferably 35% by mass or more, further preferably 40% by mass or more, and furthermore preferably 45% by mass or more, from the viewpoint of comprehensive improvement in weather resistance, freezing flow retention property, pattern-retaining property, film forming stability at low temperatures, deformation resistance, adhesion property and dilution stability. It is preferred that the total content of the polymer (I) and the polymer (II) in the emulsion particle is higher, and the upper limit of the total content is 100% by mass.

The average particle diameter of the emulsion particles is preferably 30 nm or more, more preferably 50 nm or more, and further preferably 70 nm or more, from the viewpoint of improvement in storage stability of the emulsion particles, and is preferably 250 nm or less, and more preferably 200 nm or less, from the viewpoint of improvement in water penetration resistance of a coating film.

Incidentally, the average particle diameter of the emulsion particles as described herein means a volume average particle diameter as determined by using an apparatus for determining a particle size distribution based on a dynamic light scattering method, commercially available from Particle Sizing Systems Corporation under the trade name of ICOMP Model 380.

The content of non-volatile components in the resin emulsion for a coating material of the present invention is preferably 30% by mass or more, and more preferably 40% by mass or more, from the viewpoint of improvement in productivity, and is preferably 70% by mass or less, and more preferably 60% by mass or less, from the viewpoint of improvement in handiness.

Incidentally, the content of non-volatile components in the resin emulsion for a coating material as described herein means a value as determined by weighing 1 g of the resin emulsion for a coating material, drying the resin emulsion for 1 hour at a temperature of 110° C., weighing the resulting residue which is regarded as a non-volatile component, and determining the content of the non-volatile component based on the equation:

[Content of non-volatile components in resin emulsion for a coating material (% by mass)]= ([Mass of residue]÷[1 g of resin emulsion for a coating material])×100.

The minimum film forming temperature of the resin emulsion for a coating material of the present invention is preferably −5° C. or higher, more preferably 5° C. or higher, and further preferably 10° C. or higher, from the viewpoint of enhancing film hardness, and is preferably 70° C. or lower, more preferably 65° C. or lower, and further preferably 60° C. or lower, from the viewpoint of improvement in film forming property.

Incidentally, the minimum film-forming temperature of the resin emulsion for a coating material as described herein means a temperature at which a crack is generated when the resin emulsion for a coating material is applied to a glass plate placed on a thermal gradient testing machine by means of an applicator so that a coating film having a thickness of 0.2 mm is formed, and the coating film is dried.

The resin emulsion for a coating material of the present invention may contain, for example, additives such as an ultraviolet absorbing agent, an ultraviolet stabilizing agent, a filler, a leveling agent, a dispersing agent, a thickener, a wetting agent, a plasticizer, a stabilizing agent, a dye, a pigment and an antioxidant in an appropriate amount, respectively, within a scope which would not hinder an object of the present invention.

The resin emulsion for a coating material of the present invention obtained as described above forms a coating film which is comprehensive improvement in weather resistance, freezing flow retention property, pattern-retaining property, film forming stability at low temperatures, deformation resistance, adhesion property and dilution stability. The resin emulsion for a coating material therefore can be suitably used in, for example, coating materials such as a top coating material which is called as a top coat (aqueous coating material) which is applied to the surface of an interior material and an exterior material of a building, a ceramic building material, and the like.

The coating material of the present invention is characterized in that the coating material contains the above-mentioned resin emulsion for a coating material. The coating material of the present invention can be composed of only the resin emulsion for a coating material. Alternatively, the coating material of the present invention may contain the above-mentioned resin emulsion for a coating material and, for example, one or more components selected from a film-forming auxiliary agent, a plasticizer, a foam agent, a pigment, a thickener, a matting agent, a dispersing agent, a wetting agent, an ultraviolet absorbing agent, an ultraviolet stabilizing agent, a filler, a leveling agent, a stabilizer, a pigment, a dye, an antioxidant and the like within a scope which would not hinder an object of the present invention. The coating material includes, for example, an enamel coating material, a clear coating material, and the like.

The coating material of the present invention can be applied to form only one layer. Alternatively, the coating material can be applied to form two or more layers by repeatedly coating the coating material. When a coating film having two or more layers is formed by repeatedly coating the coating material, only a part of the layers can be formed by the coating material of the present invention, or all of the layers can be formed by the coating material of the present invention. A method for repeatedly coating a coating material includes, for example, a method which includes applying a coating material for a first layer (for example, undercoat layer) to a substrate to which a primer treatment or a sealer treatment has been previously applied, drying the formed first layer, and thereafter applying a coating material for a second layer (for example, top layer) to the substrate, and drying the formed second layer, and the like. The present invention is not limited only to the method. A method for applying the coating material of the present invention includes, for example, a method for applying the coating material with a brush, a bar coater, an applicator, air spray coating, airless spray coating, a roll coater, a flow coater or the like, and the present invention is not limited only to those exemplified ones.

The coating material of the present invention can be suitably applied to, for example, an interior wall and an exterior wall of a building. In addition, the coating material of the present invention can be also suitably applied to an inorganic building material such as a ceramic-based building material. The ceramic-based building material includes, for example, a brick, an exterior wall material and the like. The ceramic-based building material can be obtained by adding an inorganic filler, a fibrous material and the like to a hydraulic gluing agent which will be a raw material of an inorganic hardened body, molding the resulting mixture, aging and curing the resulting molded body. The inorganic building material which is used in an exterior material of a building includes, for example, a flexible board, a calcium silicate board, a gypsum slag perlite board, a wood cement board, a precast concrete plate, an ALC plate, a gypsum board, and the like.

When the coating material of the present invention is applied to a building material, for example, a spray painting, a roller painting, a brush painting, a trowel painting and the like can be used.

Incidentally, when the coating material the present invention is applied to the surface and the back surface of a building material, the building material can be previously heated as occasion demands from the viewpoint of efficient production of a building material having a coating film on both surfaces.

EXAMPLES

Next, the present invention is more specifically described based on working examples. However, the present invention is not limited only to the examples. Incidentally, in the following examples, "parts" means "parts by mass", and "%" means "% by mass" unless otherwise noted.

Preparation Example 1

An amount of 223 parts of deionized water, 60 parts of a dispersing agent [manufactured by Kao Corporation, product name: DEMOL EP], 50 parts of a dispersant [manufactured by DKS Co. Ltd., product name: Discoat N-14], 10 parts of a wetting agent [manufactured by Kao Corporation, product name: EMULGEN LS-106], 50 parts of propylene glycol, 1000 parts of titanium dioxide [manufactured by ISHIHARA SANGYO KAISHA LTD., product name: TIPAQUE CR-95] and 200 parts of glass beads (diameter: 1 mm) were dispersed at a rotation speed of 3000 $min^{-1}$ for 60 minutes by means of a homogenizer (homodisper), and the resulting mixture was filtrated with a wire mesh having 100 meshes (JIS mesh, hereinafter referred to the same), to give a white paste.

Example 1

A flask equipped with a dropping funnel, a stirrer, a nitrogen gas inlet tube, a thermometer and a reflux condenser was charged with 764 parts of deionized water. The dropping funnel was charged with 189 parts of deionized water, 40 parts of 25% aqueous solution of an emulsifier [manufactured by DKS Co. Ltd., product name: Aqualon BC-10], 450 parts of styrene, 40 parts of 2-ethylhexyl acrylate and 10 parts of methacrylic acid, to give a pre-emulsion for dropping, and 73 parts of the pre-emulsion for dropping, which was 5% of the total amount of the total monomer components, was added to the flask. The components in the flask were heated to 80° C. while blowing nitrogen gas gently into the flask, and 10 parts of 5% aqueous solution of ammonium persulfate was added to the flask, to initiate a polymerization. Thereafter, the pre-emulsion for dropping remaining in the dropping funnel and 15 parts of 5% aqueous solution of ammonium persulfate were homogeneously added dropwise to the flask over a period of 120 minutes.

After the completion of dropwise addition, the contents in the flask were maintained at 80° C. for 60 minutes. Subsequently, a pre-emulsion for second-stage dropping was prepared by mixing 189 parts of deionized water, 40 parts of 25% aqueous solution of an emulsifier [manufactured by ADEKA Co., Ltd., product name: ADEKA REASOAP SR-10], 50 parts of styrene, 150 parts of methyl methacrylate, 270 parts of 2-ethylhexyl acrylate and 30 parts of 2,2,6,6-tetramethylpiperidine-4-methacrylate in the dropping funnel. The resulting pre-emulsion and 15 parts of 5% aqueous solution of ammonium persulfate were homogeneously added dropwise to the flask over a period of 120 minutes.

Next, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a two-layer structure. The content of styrene in the monomer component for forming the inner layer was 90%, and the content of the acrylic acid ester in the monomer component for forming the outer layer was 90%. The mass ratio of the inner layer to the outer layer was 50/50, and the total content of the inner layer and the outer layer in the emulsion particle was 100%. The content of styrene in the total monomers used as a raw material of the emulsion particle was 50%, and the content of the acid group-containing monomer was 1% in the total monomers used as starting materials of the emulsion particle. The glass transition temperature of the polymer (II) which formed the outer layer was −15° C., and the glass transition temperature of the polymer (I) which formed the inner layer was 77° C. The glass transition temperature of the entire emulsion particle was 24° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 $min^{-1}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Example 2

A flask equipped with a dropping funnel, a stirrer, a nitrogen gas inlet tube, a thermometer and a reflux condenser was charged with 764 parts of deionized water. The dropping funnel was charged with 94.5 parts of deionized water, 20 parts of 25% aqueous solution of an emulsifier [manufactured by DKS Co. Ltd., product name: Aqualon BC-10] and 250 parts of styrene, to give a pre-emulsion for dropping, and 73 parts of the pre-emulsion for dropping, which was 5% of the total amount of the total monomer components, was added to the flask. The components in the flask were heated to 80° C. while blowing nitrogen gas gently into the flask, and 10 parts of 5% aqueous solution of ammonium persulfate was added to the flask, to initiate a polymerization. Thereafter, the pre-emulsion for dropping remaining in the dropping funnel and 7.5 parts of 5% aqueous solution of ammonium persulfate were homogeneously added dropwise to the flask over a period of 60 minutes.

After the completion of dropwise addition, the contents in the flask were maintained at 80° C. for 60 minutes. Subsequently, a pre-emulsion for second-stage dropping was prepared by mixing 283.5 parts of deionized water, 60 parts of 25% aqueous solution of an emulsifier [manufactured by ADEKA Co., Ltd., product name: ADEKA REASOAP SR-10], 400 parts of methyl methacrylate, 330 parts of 2-ethylhexyl acrylate, 10 parts of gamma-methacryloxypropyltrimethoxysilane and 10 parts of 2,2,6,6-tetramethylpiperidine-4-methacrylate in the dropping funnel. The resulting pre-emulsion and 22.5 parts of 5% aqueous solution of ammonium persulfate were homogeneously added dropwise to the flask over a period of 180 minutes.

Next, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a two-layer structure. The content of styrene in the monomer component for forming the inner layer was 100%, and the content of the acrylic acid ester in the monomer component for forming the outer layer was 100%. The mass ratio of the inner layer to the outer layer was 25/75, and the total content of the inner layer and the outer layer in the emulsion particle was 100%. The content of styrene in the total monomers used as a raw material of the emulsion particle was 25%, and the content of the acid group-containing monomer was 0% in the total monomers used as starting materials of the emulsion particle. The glass transition temperature of the polymer (II) which formed the outer layer was 1° C., and the glass transition temperature of the polymer (I) which formed the inner layer was 100° C. The glass transition temperature of the entire emulsion particle was 21° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 $min^{-1}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Example 3

A flask equipped with a dropping funnel, a stirrer, a nitrogen gas inlet tube, a thermometer and a reflux condenser was charged with 764 parts of deionized water. The dropping funnel was charged with 120 parts of deionized water, 27 parts of 25% aqueous solution of an emulsifier [manufactured by DKS Co. Ltd., product name: Aqualon BC-10], 300 parts of styrene, 30 parts of 2-ethylhexyl acrylate and 3 parts of methacrylic acid, to give a pre-emulsion for dropping, and 73 parts of the pre-emulsion for dropping, which was 5% of the total amount of the total monomer components, was added to the flask. The components in the flask were heated to 80° C. while blowing nitrogen gas gently into the flask, and 10 parts of 5% aqueous solution of ammonium persulfate was added to the flask, to initiate a polymerization. Thereafter, the pre-emulsion for dropping remaining in the dropping funnel and 10 parts of 5% aqueous solution of ammonium persulfate were homogeneously added dropwise to the flask over a period of 90 minutes.

After the completion of dropwise addition, the contents in the flask were maintained at 80° C. for 60 minutes. Subsequently, a pre-emulsion for second-stage dropping was prepared by mixing 126 parts of deionized water, 27 parts of 25% aqueous solution of an emulsifier [manufactured by ADEKA Co., Ltd., product name: ADEKA REASOAP SR-10], 140 parts of methyl methacrylate, 190 parts of 2-ethylhexyl acrylate and 3 parts of methacrylic acid in the dropping funnel. The resulting pre-emulsion and 10 parts of 5% aqueous solution of ammonium persulfate were homogeneously added dropwise to the flask over a period of 90 minutes.

Next, the contents in the flask were maintained at 80° C. for 60 minutes. Subsequently, a pre-emulsion for dropping was prepared by mixing 126 parts of deionized water, 27 parts of 25% aqueous solution of an emulsifier [manufactured by ADEKA Co., Ltd., product name: ADEKA REASOAP SR-10], 234 parts of methyl methacrylate, 90 parts of 2-ethylhexyl acrylate and 10 parts of 2,2,6,6-tetramethylpiperidine-4-methacrylate in the dropping funnel, to give a pre-emulsion for adding dropwise. The resulting pre-emulsion and 10 parts of 5% aqueous solution of ammonium persulfate were homogeneously added dropwise to the flask over a period of 90 minutes.

After the completion of dropwise addition, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a three-layer structure. The content of styrene in the monomer component for forming the inner layer was 90%, and the content of the acrylic acid ester in the monomer component for forming the outer layer was 100%. A middle layer was formed between the inner layer and the outer layer. The mass ratio of the inner layer to the outer layer was 50/50, and the total content of the inner layer and the outer layer in the emulsion particle was about 66.7%. The content of styrene in the total monomers used as a raw material of the emulsion particle was 30%, and the content of the acid group-containing monomer was 0.3% in the total monomers used as starting materials of the emulsion particle. The glass transition temperature of the polymer (II) which formed the outer layer was 34° C., and the glass transition temperature of the polymer (I) which formed the inner layer was 74° C. The glass transition temperature of the entire emulsion particle was 25° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 $min^{-1}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Example 4

A flask equipped with a dropping funnel, a stirrer, a nitrogen gas inlet tube, a thermometer and a reflux condenser was charged with 764 parts of deionized water. The dropping funnel was charged with 94.5 parts of deionized water, 20 parts of 25% aqueous solution of an emulsifier [manufactured by DKS Co. Ltd., product name: Aqualon BC-10] and 250 parts of styrene, to give a pre-emulsion for dropping, and 73 parts of the pre-emulsion for dropping, which was 5% of the total amount of the total monomer components, was added to the flask. The components in the flask were heated to 80° C. while blowing nitrogen gas gently into the flask, and 10 parts of 5% aqueous solution of ammonium persulfate was added to the flask, to initiate a polymerization. Thereafter, the pre-emulsion for dropping remaining in the dropping funnel and 7.5 parts of 5% aqueous solution of ammonium persulfate were homogeneously added dropwise to the flask over a period of 60 minutes.

After the completion of dropwise addition, the contents in the flask were maintained at 80° C. for 60 minutes. Subsequently, a pre-emulsion for second-stage dropping was prepared by mixing 283.5 parts of deionized water, 60 parts of 25% aqueous solution of an emulsifier [manufactured by ADEKA Co., Ltd., product name: ADEKA REASOAP SR-10], 380 parts of methyl methacrylate, 330 parts of 2-ethylhexyl acrylate, 10 parts of gamma-methacryloxypropyltrimethoxysilane and 30 parts of acrylic acid in the dropping funnel. The resulting pre-emulsion and 22.5 parts of 5% aqueous solution of ammonium persulfate were homogeneously added dropwise to the flask over a period of 180 minutes.

Next, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a two-layer structure. The content of styrene in the monomer component for forming the inner layer was 100%, and the content of the acrylic acid ester in the monomer component for forming the outer layer was 96%. The mass ratio of the inner layer to the outer layer was 25/75, and the total content of the inner layer and the outer layer in the emulsion particle was 100%. The content of styrene in the total monomers used as a raw material of the emulsion particle was 25%, and the content of the acid group-containing monomer was 3% in the total monomers used as starting materials of the emulsion particle. The glass transition temperature of the polymer (II) which formed the outer layer was 1° C., and the glass transition temperature of the polymer (I) which formed the inner layer was 100° C. The glass transition temperature of the entire emulsion particle was 21° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 min$^{-3}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Example 5

A flask equipped with a dropping funnel, a stirrer, a nitrogen gas inlet tube, a thermometer and a reflux condenser was charged with 764 parts of deionized water. The dropping funnel was charged with 126 parts of deionized water, 27 parts of 25% aqueous solution of an emulsifier [manufactured by DKS Co. Ltd., product name: Aqualon BC-10], 280 parts of styrene, 50 parts of methyl methacrylate and 3 parts of methacrylic acid, to give a pre-emulsion for dropping, and 73 parts of the pre-emulsion for dropping, which was 5% of the total amount of the total monomer components, was added to the flask. The components in the flask were heated to 80° C. while blowing nitrogen gas gently into the flask, and 10 parts of 5% aqueous solution of ammonium persulfate was added to the flask, to initiate a polymerization. Thereafter, the pre-emulsion for dropping remaining in the dropping funnel and 10 parts of 5% aqueous solution of ammonium persulfate were homogeneously added dropwise to the flask over a period of 90 minutes.

After the completion of dropwise addition, the contents in the flask were maintained at 80° C. for 60 minutes. Subsequently, a pre-emulsion for second-stage dropping was prepared by mixing 126 parts of deionized water, 27 parts of 25% aqueous solution of an emulsifier [manufactured by ADEKA Co., Ltd., product name: ADEKA REASOAP SR-10], 140 parts of methyl methacrylate, 190 parts of 2-ethylhexyl acrylate and 3 parts of methacrylic acid in the dropping funnel. The resulting pre-emulsion and 10 parts of 5% aqueous solution of ammonium persulfate were homogeneously added dropwise to the flask over a period of 90 minutes.

Next, the contents in the flask were maintained at 80° C. for 60 minutes. A pre-emulsion for dropping was prepared by mixing 126 parts of deionized water, 27 parts of 25% aqueous solution of an emulsifier [manufactured by ADEKA Co., Ltd., product name: ADEKA REASOAP SR-10], 222 parts of methyl methacrylate, 90 parts of 2-ethylhexyl acrylate and 10 parts of methacrylic acid, 15 parts of acrylic acid and 1 part of 2,2,6,6-tetramethylpiperidine-4-methacrylate in the dropping funnel, to give a pre-emulsion for adding dropwise. The resulting pre-emulsion and 10 parts of 5% aqueous solution of ammonium persulfate were homogeneously added dropwise to the flask over a period of 90 minutes.

After the completion of dropwise addition, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a three-layer structure. The content of styrene in the monomer component for forming the inner layer was 84%, and the content of the acrylic acid ester in the monomer component for forming the outer layer was 94%. A middle layer was formed between the inner layer and the outer layer. The mass ratio of the inner layer to the outer layer was 50/50, and the total content of the inner layer and the outer layer in the emulsion particle was about 66.7%. The content of styrene in the total monomers used as a raw material of the emulsion particle was 28%, and the content of the acid group-containing monomer was 2.4% in the total monomers used as starting materials of the emulsion particle. The glass transition temperature of the polymer (II) which formed the outer layer was 34° C., and the glass transition temperature of the polymer (I) which formed the inner layer was 101° C. The glass transition temperature of the entire emulsion particle was 31° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 min$^{-1}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Comparative Example 1

A flask equipped with a dropping funnel, a stirrer, a nitrogen gas inlet tube, a thermometer and a reflux condenser was charged with 764 parts of deionized water. The dropping funnel was charged with 189 parts of deionized water, 40 parts of 25% aqueous solution of an emulsifier [manufactured by DKS Co. Ltd., product name: Aqualon BC-10] and 450 parts of styrene, 40 parts of 2-ethylhexyl acrylate and 10 parts of methacrylic acid, to give a pre-emulsion for dropping, and 73 parts of the pre-emulsion for dropping, which was 5% of the total amount of the total monomer components, was added to the flask. The components in the flask were heated to 80° C. while blowing nitrogen gas gently into the flask, and 10 parts of 5% aqueous solution of ammonium persulfate was added to the flask, to initiate a polymerization. Thereafter, the pre-emulsion for dropping remaining in the dropping funnel and 15 parts of 5% aqueous solution of ammonium persulfate were homogeneously added dropwise to the flask over a period of 120 minutes.

After the completion of dropwise addition, the contents in the flask were maintained at 80° C. for 60 minutes. Subsequently, a pre-emulsion for second stage adding dropwise was prepared by mixing 189 parts of deionized water, 40 parts of 25% aqueous solution of an emulsifier [manufactured by ADEKA Co., Ltd., product name: ADEKA REASOAP SR-10], 200 parts of styrene, 270 parts of 2-ethylhexyl acrylate and 30 parts of 2,2,6,6-tetramethylpiperidine-4-methacrylate in the dropping funnel. The resulting pre-emulsion and 15 parts of 5% aqueous solution of ammonium persulfate were homogeneously added dropwise to the flask over a period of 120 minutes.

Next, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a two-layer structure. The content of styrene in the monomer component for forming the inner layer was 90%, and the content of the acrylic acid ester in the monomer component for forming the outer layer was 60%. The mass ratio of the inner layer to the outer layer was 50/50, and the total content of the inner layer and the outer layer in the emulsion particle was 100%. The content of styrene in the total monomers used as a raw material of the emulsion particle was 65%, and the content of the acid group-containing monomer was 1% in the total monomers used as starting materials of the emulsion particle. The glass transition temperature of the polymer (II) which formed the outer layer was −15° C., and the glass transition temperature of the polymer (I) which formed the inner layer was 77° C. The glass transition temperature of the entire emulsion particle was 24° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 min$^{-1}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Comparative Example 2

A flask equipped with a dropping funnel, a stirrer, a nitrogen gas inlet tube, a thermometer and a reflux condenser was charged with 764 parts of deionized water. The dropping funnel was charged with 189 parts of deionized water, 40 parts of 25% aqueous solution of an emulsifier [manufactured by DKS Co. Ltd., product name: Aqualon BC-10] and 250 parts of styrene, 200 parts of methyl methacrylate, 40 parts of 2-ethylhexyl acrylate and 10 parts of methacrylic acid, to give a pre-emulsion for dropping, and 73 parts of the pre-emulsion for dropping, which was 5% of the total amount of the total monomer components, was added to the flask. The components in the flask were heated to 80° C. while blowing nitrogen gas gently into the flask, and 10 parts of 5% aqueous solution of ammonium persulfate was added to the flask, to initiate a polymerization. Thereafter, the pre-emulsion for dropping remaining in the dropping funnel and 15 parts of 5% aqueous solution of ammonium persulfate were homogeneously added dropwise to the flask over a period of 120 minutes.

After the completion of dropwise addition, the contents in the flask were maintained at 80° C. for 60 minutes. Subsequently, a pre-emulsion for second stage adding dropwise was prepared by mixing 189 parts of deionized water, 40 parts of 25% aqueous solution of an emulsifier [manufactured by ADEKA Co., Ltd., product name: ADEKA REASOAP SR-10], 210 parts of methyl methacrylate, 270 parts of 2-ethylhexyl acrylate, 10 parts of methacrylic acid and 10 parts of 2,2,6,6-tetramethylpiperidine-4-methacrylate in the dropping funnel. The resulting pre-emulsion and 15 parts of 5% aqueous solution of ammonium persulfate were homogeneously added dropwise to the flask over a period of 120 minutes.

Next, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a two-layer structure. The content of styrene in the monomer component for forming the inner layer was 50%, and the content of the acrylic acid ester in the monomer component for forming the outer layer was 100%. The mass ratio of the inner layer to the outer layer was 50/50, and the total content of the inner layer and the outer layer in the emulsion particle was 100%. The content of styrene in the total monomers used as a raw material of the emulsion particle was 25%, and the content of the acid group-containing monomer was 2% in the total monomers used as starting materials of the emulsion particle. The glass transition temperature of the polymer (II) which formed the outer layer was −15° C., and the glass transition temperature of the polymer (I) which formed the inner layer was 79° C. The glass transition temperature of the entire emulsion particle was 25° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 min$^{-1}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Comparative Example 3

A flask equipped with a dropping funnel, a stirrer, a nitrogen gas inlet tube, a thermometer and a reflux condenser was charged with 764 parts of deionized water. The dropping funnel was charged with 190 parts of deionized water, 4 parts of 25% aqueous solution of an emulsifier [manufactured by DKS Co. Ltd., product name: Aqualon BC-10] and 50 parts of styrene, to give a pre-emulsion for dropping, and the resulting whole pre-emulsion was added to the flask. The components in the flask were heated to 80° C. while blowing nitrogen gas gently into the flask, and 10 parts of 5% aqueous solution of ammonium persulfate was added to the flask, to initiate a polymerization. Thereafter, the contents of the flask were maintained at 80° C. for 30 minutes. Subsequently, a pre-emulsion for second stage adding dropwise was prepared by mixing 359 parts of deionized water, 76 parts of 25% aqueous solution of an emulsifier [manufactured by ADEKA Co., Ltd., product name: ADEKA REASOAP SR-10], 410 parts of methyl methacrylate, 510 parts of 2-ethylhexyl acrylate and 30 parts of 2,2,6,6-tetramethylpiperidine-4-methacrylate in the dropping funnel. The resulting pre-emulsion and 30 parts of 5% aqueous solution of ammonium persulfate were homogeneously added dropwise to the flask over a period of 240 minutes.

After the completion of dropwise addition, the contents in the flask were maintained at 80° C. for 60 minutes, and a pH of the contents was adjusted to 8 by adding 25% aqueous ammonia, to complete a polymerization. The resulting reaction solution was cooled to room temperature, and then the reaction solution was filtrated with a wire mesh having 300 meshes, to give a resin emulsion. The content of non-volatile components in this resin emulsion was 45%.

The emulsion particles contained in the resin emulsion obtained in above had a two-layer structure. The content of styrene in the monomer component for forming the inner layer was 100%, and the content of the acrylic acid ester in the monomer component for forming the outer layer was 100%. The mass ratio of the inner layer to the outer layer was 50/50, and the total content of the inner layer and the outer layer in the emulsion particle was 100%. The content of styrene in the total monomers used as a raw material of the emulsion particle was 5%, and the content of the acid group-containing monomer was 0% in the total monomers used as starting materials of the emulsion particle. The glass transition temperature of the polymer (II) which formed the outer layer was −14° C., and the glass transition temperature of the polymer (I) which formed the inner layer was 100° C. The glass transition temperature of the entire emulsion particle was −10° C.

As a film forming auxiliary agent, 12 parts of 2,2,4-trimethyl-1,3-pentanediol monoisobutyrate [manufactured by JNC CORPORATION, product No.: CS-12] was added to 100 parts of the resin emulsion obtained in the above. The resulting mixture was dispersed at a rotation speed of 1500 min$^{-1}$ for 30 minutes by means of a homogenizer (homodisper), and thereafter 30 parts of the white paste obtained in Preparation example 1 and 0.5 parts of a defoaming agent [manufactured by SAN NOPCO LIMITED, product name: SN Defoamer 777] were added to the mixture. A thickening agent [manufactured by ADEKA Co., Ltd., product name: ADEKANOL UH-420] was added to the mixture so that the viscosity of the mixture became 80KU when determined by using a viscometer [manufactured by THE BROOKFIELD CO, product No.: KU-1] at 25° C., and the mixture was stirred under this condition for 30 minutes, to give a coating material.

Next, physical properties of the coating materials obtained in the above were examined based on the following methods. The results are shown in Table 1. Incidentally, when at least one evaluation of the mark of "x" is included in the physical properties of a coating material, the coating material is regarded as failure.

(1) Weather Resistance

A slate plate [manufactured by Nippon Testpanel Co., Ltd., length: 70 mm, width: 150 mm, thickness: 6 mm] was uniformly coated with a sealer [manufactured by SK Kaken Co., Ltd., product name: EX SEALER] by means of air spray coating in a coating amount of 150 g/m$^2$, and a formed coating film was dried for one week in the air having a temperature of 23° C.

Next, the coating film of the slate plate was coated with a coating material by means of a 10 mil applicator, and a formed coating film was dried for one week in the air having a temperature of 23° C. Thereafter, the side surface and the back surface of the slate plate were sealed with an aluminum tape. The 60° specular gloss of the surface on which the coating film was formed was determined by means of a specular gloss meter [manufactured by NIPPON DENSHOKU INDUSTRIES Co., LTD., product number: VG2000].

In addition, a weather resistance test of the coating film was carried out for 500 hours under the following conditions, and the specular gloss of the surface on which the coating film was formed was determined by means of the above-mentioned specular gloss meter. The gloss retention was determined in accordance with the equation:

[Gloss retention (%)]={[Gloss after weather resistance test]÷[Gloss before weather resistance test]}×100.

The weather resistance was evaluated on the basis of the following evaluation criteria:

[Conditions for Weather Resistance Test]
Tester: METAL WEATHER (registered trademark) manufactured by DAIPLA WINTES CO., LTD. under product number of KU-R4
Irradiation: for 4 hours in the air having a temperature of 65° C. and a relative humidity of 50% (irradiation intensity: 80 mW/cm$^2$)
Wet: for 4 hours in the air having a temperature of 35° C. and a relative humidity of 98%
Shower: for 30 seconds before wetting and after wetting, respectively
(Evaluation Criteria)
⊚: Gloss retention is 90% or more.
○: Gloss retention is 80% or more and less than 90%.
Δ: gloss retention is 60% or more and less than 80%.
X: Gloss retention is less than 60%.

(2) Freezing Flow Retention Property

A procedure of charging a metal can [manufactured by ZENYU METAL INDUSTRY CO., LTD., round can for a primer] having a volume of 200 mL with 100 parts of a resin emulsion, allowing to stand in the air having a temperature of −3° C. for one day, and then allowing to stand in the air having a temperature of 23° C. for one day was regarded as one cycle. The above procedure was repeated three cycles, and then the freezing flow retention property of the resin emulsion was evaluated on the basis of the following evaluation criteria:

(Evaluation Criteria)

◎: No change in fluidity and no freezing were observed in the air of −3° C.

○: No change in fluidity and freezing were observed in the air of −3° C.

Δ: Low fluidity was observed.

X: No fluidity and solidification were observed.

(3) Pattern-Retaining Property

A slate plate [manufactured by Nippon Testpanel Co., Ltd., length: 7 cm, width: 15 cm, thickness: 6 mm] was uniformly coated with a sealer [manufactured by SK Kaken Co., Ltd., product name: EX SEALER] by means of air spray coating in a coating amount of 150 g/m², and a formed coating film was dried for one week in the air having a temperature of 23° C.

A sample prepared by adding 5 parts of water to 100 parts of a coating material was applied to the coated surface of the sealer of the slate plate by means of a sag tester [manufactured by TAIYU KIZAI KABUSHIKIKAISHA, product name: SAG TESTER BOX75-175] (a coating machine which can change a thickness of a coating film to 5 stages of 4 mil, 8 mil, 10 mil, 15 mil and 20 mil; distance between each coating film: 5 mm). This slate plate was vertically placed just after the application under a condition so that an angle between the slate plate and a table was 90°, and the coating films were dried under this condition for one day in the air having a temperature of 23° C. Thereafter, the coating films were observed with naked eyes, and evaluated on the basis of the following evaluation criteria:

(Evaluation Criteria)

◎: Coating films are clearly separated at their boundary, and no change in the coating films is observed from the coating films just after the application.

○: Coating films get closer to each other at their boundary, and the coating films are separated.

Δ: Boundary between coating films is unclear.

X: Boundary between coating films is not held.

(4) Film Forming Stability at Low Temperatures

A slate plate [manufactured by Nippon Testpanel Co., Ltd., length: 7 cm, width: 15 cm, thickness: 6 mm] was uniformly coated with a sealer [manufactured by SK Kaken Co., Ltd., product name: EX SEALER] by means of air spray coating in a coating amount of 150 g/m², and a formed coating film was dried for one week in the air having a temperature of 23° C.

A sample prepared by adding 10 parts of water to 100 parts of a coating material was applied to the coated surface of the sealer of the slate plate by means of an applicator for forming a film of 10 mil in thickness, and the coating film was dried for 24 hours in a thermostatic apparatus of which temperature was controlled to 5° C.

Next, the above-mentioned slate plate was dipped in water having room temperature, and thereafter, taken out from the water. The slate plate was dried for 24 hours at room temperature (about 25° C.). Then, the condition of the coating film of the slate plate was observed with naked eyes by enlarging 10 times with a magnifying glass, and film forming stability at low temperatures was evaluated on the basis of the following evaluation criteria:

(Evaluation Criteria)

◎: No crack is observed.

○: A small crack (length of a crack is less than 5 mm) is observed in the coating film.

X: A large crack (length of a crack is 5 mm or more) is observed in the coating film.

(5) Deformation Resistance

A slate plate [manufactured by Nippon Testpanel Co., Ltd., length: 7 cm, width: 15 cm, thickness: 6 mm] was uniformly coated with a sealer [manufactured by SK Kaken Co., Ltd., product name: EX SEALER] by means of air spray coating in a coating amount of 150 g/m², and a formed coating film was dried for one week in the air having a temperature of 23° C.

A sample prepared by adding 10 parts of water to 100 parts of a coating material was applied to the coated surface of the sealer of the slate plate by means of an applicator for forming a film of 10 mil in thickness, and the coating film was dried for 24 hours in the air having a temperature of 23° C.

Next, a gauze (length: 7 cm, width: 7 cm) was put on the surface of the formed coating film, and a weight of 250 g was placed on the gauze. The gauze was allowed to stand for two hours in the air having room temperature (about 25° C.). Thereafter, the surface of the coating film was observed with naked eyes, and deformation resistance was evaluated on the basis of the following evaluation criteria:

(Evaluation Criteria)

◎: No trace of the gauze is observed on the surface of a coating film.

○: Shallow trace of the gauze is observed on the surface of a coating film.

X: Deep trace of the gauze is observed on the surface of a coating film.

(6) Adhesion Property

A slate plate [manufactured by Nippon Testpanel Co., Ltd., length: 7 cm, width: 15 cm, thickness: 6 mm] was uniformly coated with a sealer [manufactured by SK Kaken Co., Ltd., product name: EX SEALER] by means of air spray coating in a coating amount of 30 g/m², and a formed coating film was dried for one week in the air having a temperature of 23° C.

The coating material obtained in the above was applied to the coated surface of the sealer of the slate plate by means of an applicator for forming a film of 10 mil in thickness, and the coating film was dried for one day in the air having a temperature of 23° C., to give a test panel.

Next, the coating film on the above-mentioned test panel was cut by means of a utility knife so that 100 cross-cut squares having a length of 2 mm each side were formed, and a cellophane adhesive tape [manufactured by Nichiban Co., Ltd., product number: CT405AP-18] was stuck on these squares. Thereafter, a peeling test was carried out in accordance with JIS K5400, and the number of the cross-cut squares remaining on the test panel was counted. The adhesion property was evaluated on the basis of the following evaluation criteria:

(Evaluation Criteria)

◎: Number of remaining cross-cut squares is 90 or more.

○: Number of remaining cross-cut squares is 75 to 89.

Δ: Number of remaining cross-cut squares is 50 to 74.

X: Number of remaining cross-cut squares is 49 or less.

(7) Dilution Stability

A slate plate [manufactured by Nippon Testpanel Co., Ltd., length: 7 cm, width: 15 cm, thickness: 6 mm] was uniformly coated with a sample prepared by adding 30 parts of water to 100 parts of the coating material obtained in the above by means of an applicator for forming a film of 20 mil in thickness, and the coating film was dried for one day in the air having a temperature of 23° C., to give a test panel.

The test panel obtained in the above was dipped in water having room temperature for one day, and then taken out from the water. The water existing on the test panel was wiped off, and further dried at 40° C. for one day. Thereafter, the condition of the coating film of the test panel was observed with naked eyes by enlarging 30 times with a magnifying glass, and dilution stability was evaluated on the basis of the following evaluation criteria:
(EvaluaTion Criteria)
⊚: No crack is observed in a coating film.
○: Only an air bubble is observed in a coating film.
Δ: Asmallcrack (length of a crack is less than 5 mm) is observed in a coating film.
X: A large crack (length of a crack is 5 mm or more) is observed in a coating film.
[Comprehensive Evaluation]
In the evaluation of each physical property mentioned above, the mark "⊚" was counted as 100 points, the mark "○" was counted as 80 points, the mark "Δ" was counted as 50 points, and the mark "X" was counted as 0 point. The points of each physical property were summed, to give a total score (the highest score: 700 points, the lowest score: 0 point). The total score was used as an index for evaluating comprehensive evaluation. The results are shown in Table 1.

TABLE 1

| Number of Ex. and Comp. Ex. | Physical property of Coating film | | | | | | | Comprehensive Evaluation |
|---|---|---|---|---|---|---|---|---|
| | Weather resistance | Freezing flow retention property | Pattern-retaining property | Film forming stability at low temperatures | Deformation resistance | Adhesion property | Dilution stability | |
| Ex. 1 | ○ | ○ | ⊚ | ⊚ | ○ | ○ | ○ | 600 |
| Ex. 2 | ○ | ⊚ | ○ | ⊚ | ○ | ○ | Δ | 570 |
| Ex. 3 | ⊚ | ⊚ | ○ | ⊚ | ⊚ | ○ | ○ | 640 |
| Ex. 4 | ⊚ | ⊚ | ○ | ⊚ | ○ | ⊚ | ⊚ | 660 |
| Ex. 5 | ⊚ | ⊚ | ○ | ⊚ | ⊚ | ⊚ | ⊚ | 680 |
| Comp. Ex. 1 | X | X | ○ | X | ○ | X | X | 160 |
| Comp. Ex. 2 | X | ○ | X | ○ | ○ | ○ | ○ | 400 |
| Comp. Ex. 3 | Δ | ○ | ○ | X | X | Δ | Δ | 310 |

From the results shown in Table 1, it can be seen that the resin emulsion for a coating material and the coating materials obtained in each Example are comprehensively excellent in weather resistance, freezing flow retention property, pattern-retaining property, film forming stability at low temperatures, deformation resistance, adhesion property and dilution stability.

INDUSTRIAL APPLICABILITY

The resin emulsion for a coating material of the present invention is expected to be used as a one-component type resin emulsion in coating materials such as a top coating material called as a top coat which is applied to the surface of an exterior material of a building, the surface of a ceramic building material and the like.

The invention claimed is:

1. A top coating film formed on a substrate as a top coat, said top coating film being made of a top coating material comprising a resin emulsion which comprises emulsion particles having an inner layer and an outer layer,
   wherein the emulsion particles have a three-layer structure and a glass transition temperature of −5° to 60° C.,
   wherein said inner layer comprises a polymer (I) having a glass transition temperature of 70° to 120° C., and made of a monomer component A consisting essentially of 80 to 100% by mass of a styrene-based monomer and 0 to 20% by mass of a monomer other than the styrene-based monomer selected from the group consisting of alkyl (meth)acrylate, (meth)acrylic acid, and a combination of alkyl (meth)acrylate and (meth)acrylic acid,
   wherein said outer layer comprises a polymer (II) made of a monomer component B comprising 70 to 100% by mass of a (meth)acrylic acid ester and 0 to 30% by mass of a monomer other than the (meth)acrylic acid ester,
   wherein the content of the styrene-based monomer is 20 to 40% by mass in the total monomer components used as raw materials of the emulsion particles,
   wherein a glass transition temperature of the polymer (II) is −25° to 40° C., and
   wherein the monomer component B further comprises a (meth)acrylate-based silane group-containing monomer or at least one (meth)acrylate-based ultraviolet-stable monomer selected from the group consisting of 2,2,6,6-tetramethylpiperidine-4-(meth)acrylate, 1,2,2,6,6-pentamethylpiperidine-4-(meth)acrylate, and 2,2,6,6-tetramethylpiperidine-4-cyano-4-(meth)acrylate.

2. The coating film according to claim 1, wherein the monomer component B comprises at least one (meth)acrylate-based silane group-containing monomer selected from the group consisting of gamma-(meth)acryloyloxypropyl trimethoxysilane, gamma-(meth)acryloyloxypropyl hydroxysilane, and gamma-(meth)acryloyloxypropyl methylhydroxypropyl silane.

3. The coating film according to claim 1, wherein the total monomer components used as raw materials of the emulsion particle comprise an acid group-containing monomer in a content of 0.1 to 10% by mass.

4. The coating film according to claim 1, wherein the monomer component B comprises an acid group-containing monomer in a content of 0.5 to 10% by mass.

5. A coating film comprising a top coating film and a sealer coating film, wherein the top coating film is formed on a surface of the sealer coating film, said top coating film being made of a top coating material comprising a resin emulsion which comprises emulsion particles having an inner layer and an outer layer,
   wherein the emulsion particles have a three-layer structure and a glass transition temperature of −5° to 60° C.,
   wherein said inner layer comprises a polymer (I) having a glass transition temperature of 70° to 120° C., and made of a monomer component A consisting essentially of 80 to 100% by mass of a styrene-based monomer and 0 to 20% by mass of a monomer other than the styrene-based monomer selected from the group consisting of alkyl (meth)acrylate, (meth)acrylic acid, and a combination of alkyl (meth)acrylate and (meth)acrylic acid, wherein said outer layer comprises a polymer (II) made of a monomer component B comprising 70 to 100% by mass of a (meth)acrylic acid ester and 0 to 30% by mass of a monomer other than the (meth)acrylic acid ester, wherein the content of the styrene-based monomer is 20 to 40% by mass of the total monomer components used as raw materials of the emulsion particles, wherein a glass transition temperature of the polymer (II) is −25° to 40° C., and wherein the monomer component B further comprises a (meth)acrylate-based silane group-containing monomer or at least one (meth)acrylate-based ultraviolet-stable monomer selected from the group consisting of 2,2,6,6-tetramethylpiperidine-4-(meth)acrylate, 1,2,2,6,6-pentamethylpiperidine-4-(meth)acrylate, and 2,2,6,6-tetramethylpiperidine-4-cyano-4-(meth)acrylate.

6. The coating film according to claim 5, wherein the monomer component B comprises at least one (meth)acrylate-based silane group-containing monomer selected from the group consisting of gamma-(meth)acryloyloxypropyl trimethoxysilane, gamma-(meth)acryloyloxypropyl hydroxysilane, and gamma-(meth)acryloyloxypropyl methylhydroxypropyl silane.

7. The coating film according to claim 5, wherein the total monomer components used as raw materials of the emulsion particle comprise an acid group-containing monomer in a content of 0.1 to 10% by mass.

8. The coating film according to claim 5, wherein the monomer component B comprises an acid group-containing monomer in a content of 0.5 to 10% by mass.

9. An improved top coating material producing comprehensively excellent properties of water resistance, freezing flow retention property, pattern-retaining property, film forming stability at low temperatures, deformation resistance, adhesion property and dilution stability, said top coating material comprising a resin emulsion which comprises emulsion particles having an inner layer and an outer layer, wherein the emulsion particles have a three-layer structure and a glass transition temperature of −5° to 60° C., wherein said inner layer comprises a polymer (I) having a glass transition temperature of 70° to 120° C., and made of a monomer component A consisting essentially of 80 to 100% by mass of a styrene-based monomer and 0 to 20% by mass of a monomer other than the styrene-based monomer selected from the group consisting of alkyl (meth)acrylate, (meth)acrylic acid, and a combination of alkyl (meth)acrylate and (meth)acrylic acid, wherein said outer layer comprises a polymer (II) made of a monomer component B comprising 70 to 100% by mass of a (meth)acrylic acid ester and 0 to 30% by mass of a monomer other than the (meth)acrylic acid ester, wherein the content of the styrene-based monomer is 20 to 40% by mass of the total monomer components used as raw materials of the emulsion particles, wherein a glass transition temperature of the polymer (II) is −25° to 40° C., and wherein the monomer component B further comprises a (meth)acrylate-based silane group-containing monomer or at least one (meth)acrylate-based ultraviolet-stable monomer selected from the group consisting of 2,2,6,6-tetramethylpiperidine-4-(meth)acrylate, 1,2,2,6,6-pentamethylpiperidine-4-(meth)acrylate, and 2,2,6,6-tetramethylpiperidine-4-cyano-4-(meth)acrylate.

10. The coating film according to claim 9, wherein the monomer component B comprises at least one (meth)acrylate-based silane group-containing monomer selected from the group consisting of gamma-(meth)acryloyloxypropyl trimethoxysilane, gamma-(meth)acryloyloxypropyl hydroxysilane, and gamma-(meth)acryloyloxypropyl methylhydroxypropyl silane.

11. The coating film according to claim 9, wherein the total monomer components used as raw materials of the emulsion particle comprise an acid group-containing monomer in a content of 0.1 to 10% by mass.

12. The coating film according to claim 9, wherein the monomer component B comprises an acid group-containing monomer in a content of 0.5 to 10% by mass.

\* \* \* \* \*